United States Patent
Schmid et al.

(10) Patent No.: US 11,296,779 B2
(45) Date of Patent: Apr. 5, 2022

(54) SIGNAL TERRESTRIAL REPEATER HAVING A MASTER UNIT AND A REMOTE UNIT THAT IS OPTICALLY COUPLED TO THE MASTER UNIT

(71) Applicant: Andrew Wireless Systems GmbH, Buchdorf (DE)

(72) Inventors: Peter Schmid, Marxheim-Neuhausen (DE); Stefan Eisenwinter, Buchdorf (DE); Peter Gunzner, Monheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 48 days.

(21) Appl. No.: 16/039,063

(22) Filed: Jul. 18, 2018

(65) Prior Publication Data
US 2019/0028180 A1 Jan. 24, 2019

Related U.S. Application Data

(60) Provisional application No. 62/534,001, filed on Jul. 18, 2017.

(51) Int. Cl.
*H04B 7/185* (2006.01)
*H04B 7/155* (2006.01)
(Continued)

(52) U.S. Cl.
CPC ..... *H04B 7/18513* (2013.01); *H04B 7/15514* (2013.01); *H04B 7/18519* (2013.01); *H04B 10/25* (2013.01); *H04B 10/25752* (2013.01)

(58) Field of Classification Search
CPC ...... H04B 7/14–18513; H04B 7/18519; H04B 10/25; H04B 10/25752
See application file for complete search history.

(56) References Cited

U.S. PATENT DOCUMENTS

| | | | | |
|---|---|---|---|---|
| 4,763,981 | A | * | 8/1988 | Wilkins ............... G02B 6/4416 385/101 |
| 5,794,138 | A | * | 8/1998 | Briskman .......... G11B 23/0327 343/713 |

(Continued)

FOREIGN PATENT DOCUMENTS

| | | |
|---|---|---|
| EP | 2061165 A2 | 5/2009 |
| JP | 2001308765 A | 11/2001 |

(Continued)

OTHER PUBLICATIONS

International Searching Authority, "International Search Report and Written Opinion from PCT Application No. PCT/GB2018/052036 dated Nov. 30, 2018" From PCT Counterpart of U.S. Appl. No. 16/039,063; pp. 1-13; Published in WO.

(Continued)

*Primary Examiner* — Raymond S Dean
(74) *Attorney, Agent, or Firm* — Fogg & Powers LLC

(57) ABSTRACT

In an embodiment, a signal repeater includes a master unit and a remote unit that are optically coupled to one another by, e.g., an optical fiber. The master unit includes master-unit circuitry configured to receive an input electrical signal from a satellite-signal receive antenna, and to convert the input electrical signal into an optical signal. And the remote unit includes remote-unit circuitry configured to convert the optical signal into an intermediate electrical signal, to amplify the intermediate electrical signal to generate an output electrical signal, and to couple the output electrical signal to a retransmission antenna. Because an optical channel, such as an optical fiber, typically attenuates an optical signal significantly less per unit of distance than a coaxial cable attenuates an electrical signal, such a signal repeater allows a satellite receive antenna to be located at a significant distance from a retransmit antenna.

28 Claims, 8 Drawing Sheets

(51) Int. Cl.
*H04B 10/25* (2013.01)
*H04B 10/2575* (2013.01)

(56) References Cited

U.S. PATENT DOCUMENTS

| | | | | |
|---|---|---|---|---|
| 5,802,452 | A * | 9/1998 | Grandfield | H04B 7/15528 370/315 |
| 6,549,846 | B1 * | 4/2003 | Dance | G01C 21/26 701/518 |
| 8,346,091 | B2 | 1/2013 | Kummetz et al. | |
| 9,553,656 | B2 | 1/2017 | Dussmann et al. | |
| 9,838,138 | B1 * | 12/2017 | Arabaci | H04B 10/612 |
| 2001/0038542 | A1 * | 11/2001 | MacKay | H02M 3/156 363/41 |
| 2003/0137964 | A1 * | 7/2003 | Suenaga | H04B 7/18526 370/342 |
| 2003/0175037 | A1 * | 9/2003 | Kimmitt | G02F 1/0123 398/198 |
| 2004/0047576 | A1 * | 3/2004 | Kurusu | G02B 6/02 385/123 |
| 2006/0217059 | A1 * | 9/2006 | Takano | H04H 20/02 455/3.02 |
| 2006/0223439 | A1 * | 10/2006 | Pinel | H04B 7/15507 455/11.1 |
| 2007/0015460 | A1 * | 1/2007 | Karabinis | H04B 7/18532 455/12.1 |
| 2009/0042524 | A1 * | 2/2009 | Maiuzzo | H04B 1/1036 455/188.1 |
| 2009/0285584 | A1 * | 11/2009 | Fevrier | H04B 10/2916 398/173 |
| 2011/0274145 | A1 * | 11/2011 | Braz | H04W 88/085 375/211 |
| 2013/0195467 | A1 | 8/2013 | Schmid et al. | |
| 2013/0336370 | A1 | 12/2013 | Jovanovic et al. | |
| 2015/0147960 | A1 | 5/2015 | Hanson et al. | |
| 2015/0249965 | A1 | 9/2015 | Dussmann et al. | |
| 2017/0026107 | A1 * | 1/2017 | Lange | H04B 7/15542 |

FOREIGN PATENT DOCUMENTS

| | | |
|---|---|---|
| KR | 20040092077 A * | 11/2004 |
| WO | 2010070435 A1 | 6/2010 |

OTHER PUBLICATIONS

European Patent Office, "Communication pursuant to Article 94(3) EPC from EP Application No. 18759667.1", from Foreign Counterpart to U.S. Appl. No. 16/039,063, filed Feb. 22, 2021, pp. 1 through 5, Published: US.

* cited by examiner

SIGNAL TERRESTRIAL REPEATER HAVING A MASTER UNIT AND A REMOTE UNIT THAT IS OPTICALLY COUPLED TO THE MASTER UNIT

CROSS-REFERENCE TO RELATED APPLICATIONS

This application claims the benefit of priority from U.S. Provisional Patent Application Ser. No. 62/534,001, filed on Jul. 18, 2017, the contents of which are hereby incorporated herein by reference.

SUMMARY

Communication satellites transmit (i.e., broadcast) to earth a number of commercial radio-frequency (RF) electrical signals such as cell-phone signals, voice signals and data signals other than cell-phone signals, radio signals, and television signals.

Typically, a communication satellite is configured to broadcast such commercial RF signals over a wide area of the earth's surface so that a terrestrial (e.g., ground-based, near-ground-based) device or system configured to receive one or more of such signals can do so regardless of where in the area the device or system is located. Examples of such terrestrial devices and systems include cell-phone systems, smart phones, pagers, radios, and televisions.

Unfortunately, it can be difficult to impossible for a terrestrial device or system to receive such RF signals in all locations of the satellite's broadcast area. For example, a device can be in a "coverage hole," which is a location, such as a building, under trees, or a tunnel, that does not have an unobstructed line of sight to the satellite.

Furthermore, even if a terrestrial device or system is in an unobstructed line-of-sight location in which it can receive an RF signal from a communication satellite, the size and expense of the components required to receive and amplify the signal may render the components impractical for use with the device or system. For example, even a smaller satellite-receive antenna (e.g., a satellite dish) configured for receiving satellite signals in the Ku band (12 GHz-18 GHz) can have a diameter of about 43 centimeters (cm) (about 18 inches). Although often suitable for receiving satellite television signals, an antenna of this size is typically too large, expensive, and cumbersome for a device such as a smartphone or even a car radio. Furthermore, for mobile devices such as a smart phone or a car radio, the satellite-receive antenna typically would need to be mounted on a moveable platform that includes control circuitry for maintaining a suitable orientation of the antenna relative to the satellite.

To allow a terrestrial device or system located in a "coverage hole," or for which a satellite-receive antenna is impractical, to receive RF satellite signals, engineers have developed reception-and-retransmission systems for receiving signals from communication satellites and for retransmitting (i.e., rebroadcasting) these received signals in a form that renders the retransmitted signals receivable both by terrestrial devices and systems located in satellite-coverage holes and by terrestrial devices and systems without satellite dishes. For example, such a reception-and-retransmission system can retransmit the satellite signal in a different direction than the direction of propagation of the satellite signal, can increase the power and signal-to-noise ratio (SNR) of the retransmitted signal relative to the received satellite signal, and can re-encode and re-modulate the retransmitted signal according to coding and modulation techniques that are more suitable for a terrestrial device or system to decode and demodulate.

FIG. 1 is a diagram of a satellite-communication system 10, which includes a satellite 12 and a satellite-signal receiver and retransmitter 14.

The satellite 12 can be a conventional communication satellite that transmits to earth one or more RF communication signals in one or more of the defined satellite-frequency bands, such as the L-Band (1 GHz-2 GHz), C-Band (4 GHz-8 GHz), Ku-Band (12 GHz-18 GHz), and Ka-Band (26.5 GHz-40.0 GHz). Such RF satellite signals typically carry commercial data such as voice data, radio-broadcast data, television-broadcast data, and other data (e.g., texts, emails, and data downloads and uploads from/to the world-wide web).

The satellite-signal receiver and retransmitter 14 includes a satellite-signal-receive antenna 16, an RF-signal input cable 18, a terrestrial signal repeater 20, an RF-signal output cable 22, and a retransmission antenna 24, which cooperate to receive, to condition, and to retransmit the RF satellite signals from the satellite 12 in a form that is more suitable for reception by a terrestrial device or system. For example, the system 14 can be configured to retransmit the RF satellite signals at a higher power and at a higher SNR, and in one or more different directions, as compared to the RF satellite signals that the system receives from the satellite 12.

The satellite-signal-receive antenna 16 can be a conventional satellite antenna such as a satellite dish, and can be configured to "excite" RF signals within the one or more frequency bands that the antenna is configured to receive. For example, the antenna 16 can be configured to have resonant (e.g., higher-gain) modes at frequencies that are approximately at the centers, or are otherwise within, the frequency bands of the RF signals that the antenna is configured to receive. That is, the antenna 16 can be configured to emphasize the RF signals that it is configured to receive, and to de-emphasize other signals. Such emphasis acts to amplify, and to pass on to the repeater 20, the RF signals that the receiver-and-retransmitter 14 is configured to receive, and to filter out, and to block from the repeater, out-of-band signals and noise.

The antenna 16 can also include, or be coupled to, optional receiver circuitry 26, which is configured to transcode one or more of the received RF satellite signals. That is, the receiver circuitry 26 is configured to convert the encoding of a received satellite signal from one form or algorithm to another form or algorithm, typically without a need to perform separate and distinct decoding and re-encoding steps. Said another way, the receiver circuitry 26 is configured to convert the encoding of a received satellite signal directly from one code to another code. The code to which the receiver circuitry 26 converts the RF signal may be more suitable for decoding by a terrestrial device or system configured to receive the RF signal. Similarly, the receiver circuitry 26 can be configured to convert the RF signal from one form of modulation to another form of modulation. Furthermore, the receiver circuitry 26 can be configured to emphasize and filter the received RF satellite signals, and the emphasizing and filtering that receiver circuitry is configured to perform can be instead of, or in addition to, the emphasizing and filtering performed by the antenna 16.

The RF-signal input cable 18 is configured to couple, to the repeater 20, the band-excited (and possibly transcoded or transmodulated) RF satellite signals from the antenna 16. For example, the cable 18 can be a coaxial cable having a characteristic impedance of 50 Ohms (Ω), and, for maximum power transfer, the output port of the antenna 16 (or receiver circuitry 26 if present) and the input port of the repeater 20 can each be configured to present an impedance of 50Ω to the cable.

The repeater 20 includes a conventional amplifier circuit, such as a conventional power amplifier 28, which is configured to amplify the RF satellite signal that the repeater receives from the antenna 16 (and receiver circuitry 26 if present) via the cable 18.

The RF-signal output cable 22 is configured to couple, to the retransmission antenna 24, the amplified RF satellite signal from the antenna repeater 20. For example, like the input cable 18, the output cable 22 can be a coaxial cable having a characteristic impedance of 50 Ohms (Ω), and, for maximum power transfer, the output port of the repeater 20 and the input port of the retransmission antenna 24 can each be configured to present an impedance of 50Ω to the output cable.

And the retransmission antenna 24 is configured to retransmit the amplified RF signal from the repeater 20 and the output cable 22 with a power, an SNR, and one or more directions that render the retransmitted signal more suitable for reception by a terrestrial device or system than the satellite signal from the satellite 12. The power and SNR of the retransmitted RF signal can be sufficient for a terrestrial device or system to receive the retransmitted RF signal without the need for a satellite dish. For example, a smart phone or a car radio can be configured to receive the retransmitted RF signal with antennas that are of a standard size for a smart phone and a car radio, respectively. Furthermore, a direction of the retransmitted RF signal can be suitable for reception by a terrestrial device or system that is in a coverage hole (e.g., tunnel, shadow of a tree, building, or other object) of the satellite 12, and that, therefore, would be unable to receive an RF signal directly from the satellite. Moreover, the retransmission antenna 24 can be any suitable type of antenna such as a dipole, reflector, or multi-element antenna.

Unfortunately, it can be difficult to find a suitable terrestrial location for the satellite-signal receiver and retransmitter 14.

Because the power of the received RF signals that the antenna 16 and receiver circuitry 26 provide to the input cable 18 is relatively small, and because the signal loss per unit distance (e.g., decibels (dB) per meter (m)) of the input cable is relatively high, a designer of the receiver and retransmitter 14 typically limits the length of the input cable to no more than a few meters.

For similar reasons, a designer of the receiver and retransmitter 14 typically limits the length of the output cable 22 to no more than a few meters.

Therefore, the satellite-signal receive antenna 16 (and receiver circuitry 26 if present), the repeater 20, and the retransmit antenna 24 typically are constrained to be in the same location.

But unfortunately, a location suitable for the satellite-signal receive antenna 16 may be unsuitable for the retransmit antenna 24, and vice-versa. Suitable locations for the receive antenna 16 typically lie along respective unobstructed line-of-sight paths with the satellite 12, and include relatively high places like hills, mountains, and the tops of buildings. In contrast, although a suitable location for the retransmit antenna 24 need not lie along an unobstructed line-of-sight path with the satellite 12, such a location typically lies relatively close to the ground (e.g., no more than 35 m above the ground) and in a populated area where terrestrial devices and systems configured to receive RF signals broadcast by the satellite 12 are more likely to be found.

Consequently, locations suitable for the receiver and retransmitter 14 are limited in number because such a location typically must have all of the features (e.g., unobstructed line-of-sign path, low to ground, and in a populated area) that are suitable for both the satellite-signal receive antenna 16 and the retransmit antenna 24.

Furthermore, even if the receiver and retransmitter 14 is located in a suitable place, the relatively close spacing between the satellite-signal receive antenna 16 and the retransmit antenna 24 can cause other problems. For example, in addition to receiving the signals transmitted by the satellite 12, the receive antenna 16 can receive unwanted feedback of retransmitted signals from the retransmit antenna 24. Although the repeater 20 can include circuitry to reduce or eliminate the effect of such unwanted feedback, such feedback-cancelling circuitry is typically relatively complex and expensive, and adds extra weight and heat generation to the repeater 20. Furthermore, the receive antenna 16 and the retransmit antenna 24 may become electrically coupled to one another, or may otherwise interfere with one another, such that one of the antennas may alter one or more characteristics (e.g., effective aperture) of the other antenna as compared to the characteristics that the other antenna would have in the absence of such coupling/interference. Because such antenna coupling/interference depends on a specific placement and orientation of the receive antenna 16 relative to the retransmit antenna 24, and because such placement and orientation are typically unknown until the receiver and retransmitter circuit 14 is installed, it is difficult to design and to configure the repeater 20 to minimize the effects of such antenna coupling/interference.

Therefore, a need has arisen for a receiver and transmitter configured to provide one or more of the following technical improvements: allowing independent placement of the satellite-signal receive antenna and the retransmit antenna in respective suitable locations, and reducing, or eliminating, one or more of unwanted feedback, unwanted coupling, and unwanted interference between the receive and retransmit antennas.

An embodiment of a signal repeater that solves at least one of the aforementioned problems includes a master unit and a remote unit that are optically coupled to one another. The master unit includes master-unit circuitry configured to receive an input electrical signal from a satellite-signal receive antenna, and to convert the input electrical signal into an optical signal. And the remote unit includes remote-unit circuitry configured to convert the optical signal into an intermediate electrical signal, to amplify the intermediate electrical signal into an output electrical signal, and to couple the output electrical signal to a retransmission antenna. An optical channel, such as an optical fiber, is coupled between the master and remote units and is configured to carry the optical signal from the master unit to the remote unit.

Because an optical channel, such as an optical fiber, attenuates an optical signal significantly less per unit of distance than a coaxial cable attenuates an electrical signal, a signal repeater with optically coupled master and remote units allows a satellite-signal receive antenna to be located at a significant distance (e.g., up to ~20 kilometers (~12 miles) from a retransmit antenna.

And locating the satellite-signal receive antenna far from the retransmit antenna allows both antennas to be in respective suitable locations, and reduces or eliminates electromagnetic feedback, coupling, and interference between the antennas.

DRAWINGS

DETAILED DESCRIPTION

Each non-zero value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. For example, "two planes are substantially parallel to one another" encompasses an angle $-18° \leq \alpha \leq +18°$ between the two planes (|90°| is the maximum angular difference between the two planes, ±20% of |90°| is ±18°, and the two planes are parallel to one another when $\alpha=0°$). And for a zero-value, the encompassed range is ±1 of the same units unless otherwise stated.

Figure 2:
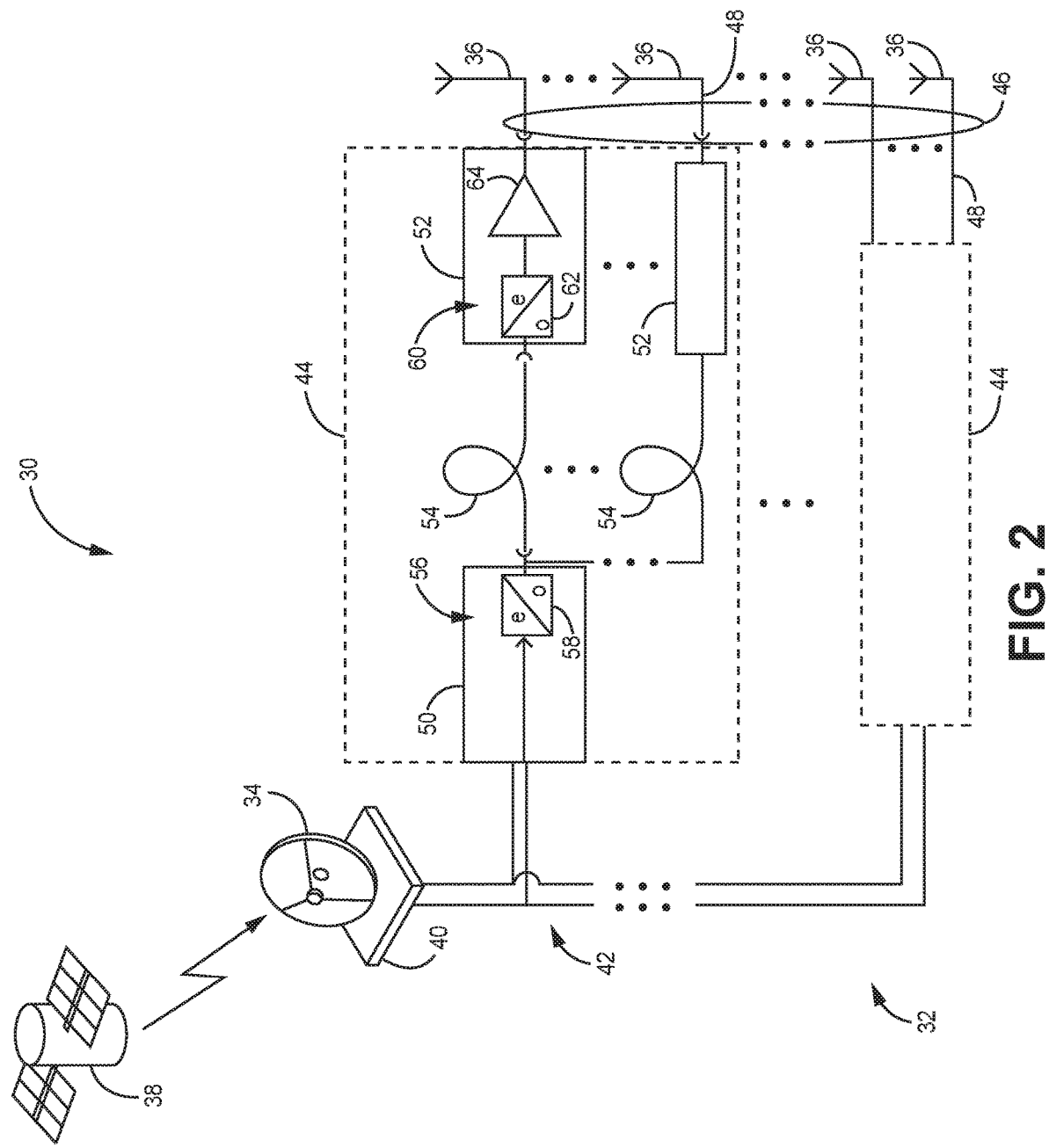
FIG. 2 is a diagram of a satellite system that includes an optical terrestrial repeater and a satellite-signal receive antenna and a retransmit antenna that are located remotely from one another, according to an embodiment.

FIG. 2 is a diagram of a satellite system 30 including an optical receiver and transmitter 32, which allows a satellite-signal receive antenna 34 and one or more satellite-signal retransmit antennas 36 to be located remotely from one another, according to an embodiment. The ability to locate the receive antenna 34 remote from each of the one or more retransmit antennas 36 allows an installer of the receiver and transmitter 32: 1) to locate the receive antenna in a location suitable for a satellite antenna but unsuitable for a retransmit antenna, 2) to locate the one or more retransmit antennas in respective locations each suitable for a retransmit antenna but unsuitable for a satellite antenna, and 3) to reduce or eliminate unwanted feedback, coupling, and interference between the receive and transmit antennas without expensive and complex feedback-, coupling-, or interference-cancelling circuitry.

The satellite system 30 includes at least one satellite 38 configured to broadcast one or more RF satellite signals, and includes the receiver and transmitter 32, which includes the satellite-signal receive antenna 34, an optional receiver circuit 40, an input cable assembly 42, one or more optical terrestrial signal repeaters 44, an output cable assembly 46, and the one or more retransmit antennas 36.

Figure 1:
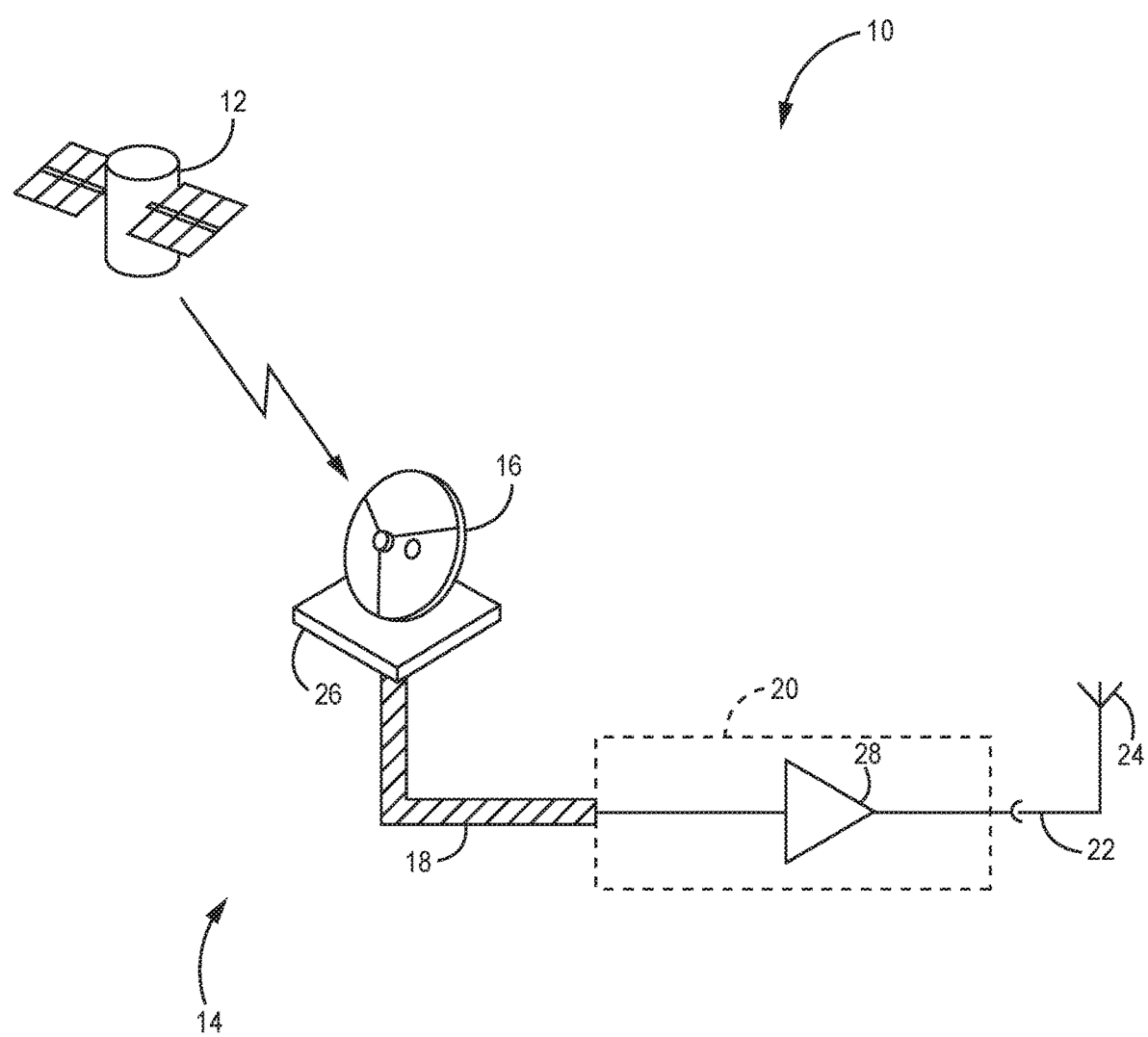
FIG. 1 is a diagram of a satellite system in which a satellite-signal receive antenna and a retransmit antenna are in the same location, or are otherwise in close proximity to one another.

The satellite 38 can be similar to the satellite 12 of FIG. 1, and can be configured to broadcast one or more commercial or other satellite RF signals in any one or more frequency bands. For example, the satellite 38 can be configured to broadcast voice-data signals, such as phone and radio signals, in the frequency band 2324 MHz-2341.5 MHz.

The satellite-signal receive antenna 34 and the receiver circuit 40 are configured to receive and to preprocess the one or more satellite RF signals broadcast by the satellite 38, and to provide one or more preprocessed RF satellite signals to one or more (e.g., up to four) optical terrestrial signal repeaters 44. For example, the receive antenna 34 and the receiver circuit 40 can be similar to the satellite-signal receive antenna 16 and the receiver circuit 26 of FIG. 1. Furthermore, the power level of the preprocessed RF satellite signal that the antenna 34 and the receiver circuit 40 (if present) provide to each of the repeaters 44 can be in the approximate range of −19 dBm-0 dBm.

The input cable assembly 42 includes one or more input cables and input connectors suitable for coupling the satellite-signal receive antenna 34 and the receiver circuit 40 (if present) to the one or more optical terrestrial signal repeaters 44. For example, the input cable assembly 42 can include one or more 50Ω coaxial cables, 50Ω signal splitters, and connectors for coupling the preprocessed RF satellite signal from the receive antenna 34 and receiver circuitry 40 (if present) to the one or more optical terrestrial signal repeaters 44. Furthermore, the longest cabled distance from the receive antenna 34 to a repeater 44 is no more than about a few meters to limit attenuation of the preprocessed RF satellite signal (i.e., to limit signal loss) as the preprocessed signal propagates along the input cable assembly 42.

The one or more optical terrestrial signal repeaters 44, one of which is described in more detail below, are each configured to drive each of one or more of the retransmit antennas 36 with a respective output RF signal that includes information carried by the satellite signal that the satellite 38 is broadcasting. Although, for clarity, only one repeater 44 is described in detail, it is understood that the other repeaters can be similar.

The output cable assembly 46 includes one or more output cables and output connectors suitable for coupling the one or more optical terrestrial signal repeaters 44 to the respective retransmit antennas 36. For example, the output cable assembly 46 can include a respective 50Ω coaxial cable 48 per retransmit antenna 36. Furthermore, the length of the longest one of the output cables 48 is no more than about a few meters to limit attenuation (i.e., to limit signal loss) of each output RF signal as it propagates from a respective repeater 44, along a respective output cable 48, to a respective retransmit antenna 36.

Still referring to FIG. 2, each of the one or more optical terrestrial repeaters 44 includes a respective master unit 50, respective one or more remote units 52, and respective one or more optical fibers 54.

The master unit 50 is located relatively close (e.g., within a few meters) to the satellite-signal receive antenna 34 and receiver circuitry 40 (if present) to reduce attenuation of the preprocessed RF satellite signal from the receive antenna and receiver circuitry (if present) as described above.

Furthermore, the master unit 50 includes master-unit circuitry 56, which includes a conventional electro-opto converter 58 that is configured to convert the preprocessed RF satellite signal from an electrical signal to an optical signal, and to couple the optical signal to one more (e.g., up to four) optical fibers 54. For example, the electro-opto converter can include a laser diode to convert the preprocessed RF satellite signal to an optical signal having a center wavelength, $\lambda_{cs}$, of approximately 1310 nanometers (nm). The master-unit circuitry 56 can be further configured to amplify, filter, or both amplify and filter, the preprocessed RF satellite signal before converting it into an optical signal. Furthermore, if the preprocessed RF satellite signal is a digital signal, then the master-unit circuitry 56 can be configured to convert the digital RF signal to a digital optical signal, or to convert the digital RF signal to an analog optical signal. Similarly, if the preprocessed RF satellite signal is an analog signal, then the master-unit circuitry 56 can be configured to convert the analog RF signal to an analog optical signal, or to convert the analog RF signal to a digital optical signal. Moreover, the master-unit circuitry 56 can transcode, or otherwise encode, the optical signal, and this transcoding/encoding can be instead of, or in addition to, any transcoding/encoding performed by the receiver circuitry 40 (if present). For example, the master-unit circuitry 56 can be configured to add an error-correcting code (ECC) to the preprocessed RF satellite signal before converting the RF satellite signal into an optical signal.

Moreover, the master unit 50 can be configured to draw approximately 15 Watts (W)-20 W of power, and, if the satellite-signal receive antenna 34 and receiver circuit 40 (if present) are mounted, for example, on the roof of a building, then the master unit can be configured for locating, and actually located, inside of the building.

Each remote unit 52 is located relatively close (e.g., within a few meters) to the retransmit antenna 36 that it feeds to reduce attenuation of the output RF signal by the output cable assembly 46 as described above.

Furthermore, each remote unit 52 includes remote-unit circuitry 60, which includes a conventional electro-opto converter 62 and a power amplifier 64. The electro-opto converter 62 is configured to convert the optical signal received from the optical fiber 54 to an intermediate RF electrical signal. For example, the electro-opto converter 62 can include a photodiode to perform such conversion. The power amplifier 64 is configured to amplify the intermediate RF electrical signal to generate an output RF satellite signal, and to couple the output RF signal to a respective retransmit antenna 36 via the output cable assembly 46 for retransmission. Furthermore, if the received optical signal is a digital signal, then the remote-unit circuitry 60 can be configured to convert the digital optical signal to an intermediate digital RF electrical signal, or to convert the digital optical signal to an intermediate analog RF electrical signal. Similarly, if the received optical signal is an analog signal, then the remote-unit circuitry 60 can be configured to convert the analog optical signal to an intermediate analog RF electrical signal, or to convert the analog optical signal to an intermediate digital RF electrical signal. Moreover, the remote-unit circuitry 60 can transcode, or otherwise encode or decode, the intermediate RF signal, and can demodulate, modulate, or demodulate and modulate, the intermediate RF signal, before or after the power amplifier 64 amplifies the intermediate RF signal. For example, the remote-unit circuitry 60 can be configured to decode the intermediate RF signal according to an ECC with which the master-unit circuitry 56 encoded the RF satellite signal before converting the RF satellite signal into an optical signal. In addition, the remote-unit circuitry 60 can be configured to control the operating parameters (e.g., gain) of the electro-opto converter 62 and of the power amplifier 64. For example, the remote-unit circuitry 60 can control, automatically, the gain of the power amplifier 64 such that the voltage swing of the output RF signal spans the power amplifier's entire dynamic output-voltage range without "hitting the rails" set by the power-supply voltages to the power amplifier.

Moreover, each remote unit 52 includes a cabinet (not shown in FIG. 2) in which the remote-unit circuitry 60 and other components of the remote unit are disposed. For example, the cabinet has dimensions of approximately 800 millimeters (mm)×120 mm×100 mm. In addition, the remote unit 52 (including the cabinet) weighs no more than about 20 kilograms (kg), and, while operating, draws no more than approximately 150 W of power and drives the respective retransmission antenna 36 with up to approximately 6 W of power. A remote unit 52 so configured is suitable for mounting outdoors, e.g., on a light pole in a shopping-center parking lot.

Each optical fiber 54 can be made long enough to allow the master unit 50 to be spaced apart from each remote unit 52 by up to approximately 20 Km (approximately 12 miles). To allow such a distance between the master unit 50 and a remote unit 52, the optical fiber 54 can be configured to impart, to the optical signal, an attenuation of no more than approximately 0.5 dB per Km. Therefore, even at a separation of 20 Km, the signal loss between the master unit 50 and a remote unit 52 is no more than approximately 10 dB.

Still referring to FIG. 2, operation of the satellite system 30 is described, according to an embodiment. For clarity, the operation of only a single repeater 44, and only a single remote unit 52 of that repeater, is described, it being understood that the other repeaters and remote units can operate in a similar manner.

The satellite 38 generates and broadcasts an RF satellite signal carrying information (e.g., voice data).

Next, the satellite-signal receive antenna 34 receives the RF satellite signal from the satellite 38, and the receive antenna and the receiver circuitry 40 (if present) preprocess the received RF satellite signal, e.g., by band exciting, filtering, amplifying, or transcoding the signal, and provide the preprocessed RF satellite signal to the master unit 50 via the input cable assembly 42.

Then, the master-unit circuitry 56 optionally modifies the preprocessed RF satellite signal by amplifying, modulating, demodulating, transcoding, or otherwise encoding or decoding the preprocessed RF satellite signal, and the electro-opto converter 58 converts the optionally modified RF satellite signal to an optical signal and provides the optical signal to the optical fiber 54. For example, the electro-opto converter 58 generates the optical signal at a center wavelength, $\lambda_c$, of approximately 1310 nanometers (nm).

Next, the electro-opto converter 62 of the remote unit 52 converts the optical signal into an intermediate RF electrical signal, and the remote-unit circuitry 60 optionally demodulates, transcodes, or otherwise encodes or decodes the intermediate RF electrical signal.

Then, the amplifier 64 amplifies the intermediate (and optionally modified) RF electrical signal to generate an output RF signal, and provides the output RF signal to the retransmit antenna 36.

Next, the retransmit antenna 36 generates a retransmission RF satellite signal from the output RF signal, and retransmits/broadcasts the retransmission RF satellite signal.

The retransmission RF satellite signal carries the same information (e.g., voice data) as the RF satellite signal from the satellite 38.

Other than carrying the same information, the retransmission RF satellite signal broadcast by the retransmit antenna 36 can be (but for power level) the same as the RF satellite signal broadcast by the satellite 38, or can have one or more different characteristics (e.g., coding, modulation, group delay, form (digital or analog)) than the RF satellite signal.

Still referring to FIG. 2, alternate embodiments of the satellite system 30 are contemplated. For example, another optical path, such as a line-of-sight optical path through the atmosphere, can replace, or be used in conjunction with, one or more of the optical fibers 54. Furthermore, the input and output cable assemblies 42 and 46 can be replaced with optical fibers, and the one or more optical fibers 54 can be replaced with respective coaxial cables. Moreover, the power consumption and power output of the master unit 50 can be different than described. In addition, the dimensions, weight, power consumption, and power output of one or more of the remote units 52 can be different than described. Furthermore, although described as including a single master unit 50, each repeater 44 can include more than one master unit.

Figure 3:
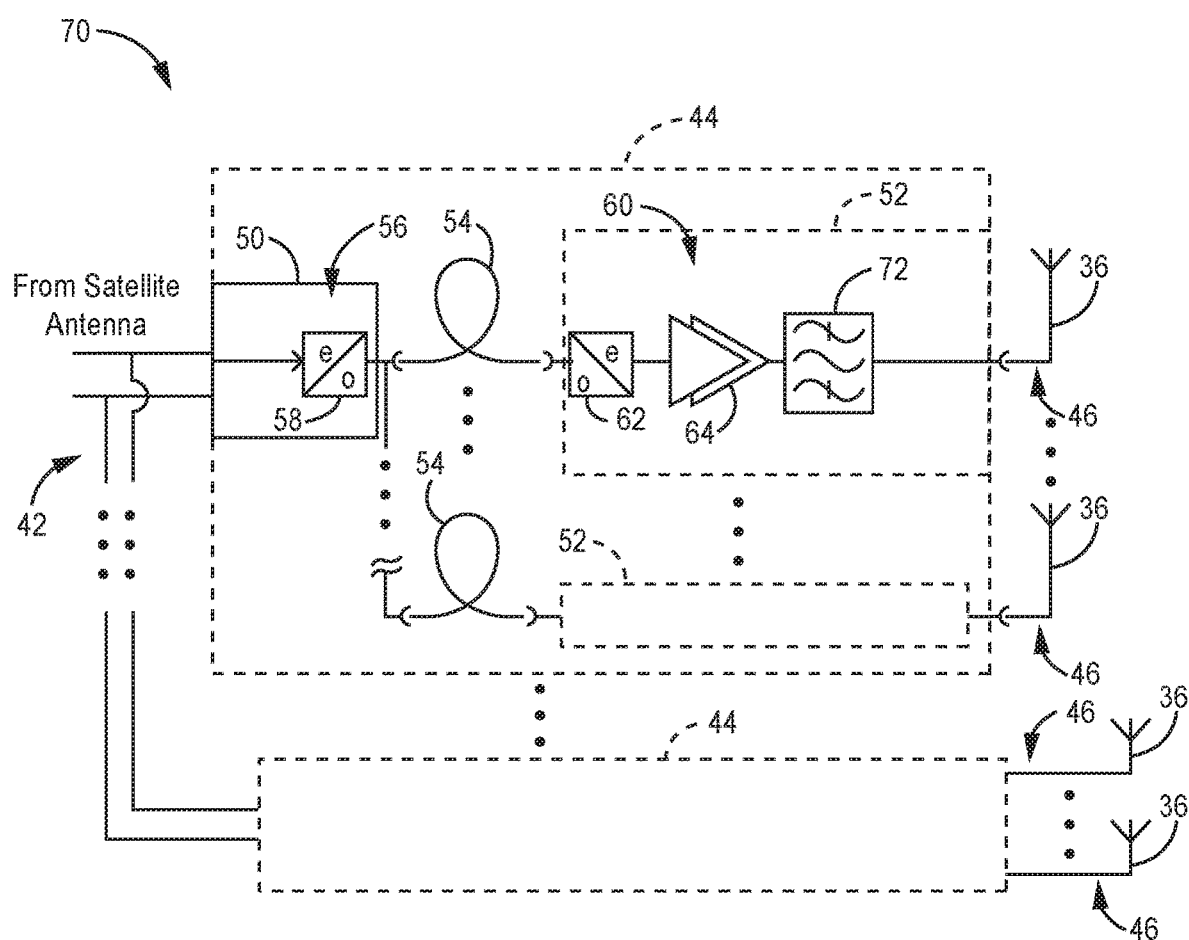
FIG. 3 is a diagram of a receiver and retransmitter that includes an optical terrestrial repeater having a remote unit with a single filtered signal-retransmission path, according to an embodiment.

FIG. 3 is a diagram of a portion of a receiver and retransmitter 70, according to an embodiment. The receiver and retransmitter 70 is similar to the receiver and retransmitter 32 of FIG. 2 except that the remote units 52 of the receiver and transmitter 70 each include a respective bandpass filter 72 coupled between the power amplifier 64 and the antenna 36. In FIG. 3, like numbers are used to reference components that are common to FIGS. 2 and 3.

The bandpass filter 72 can be any suitable type of filter having a passband that is approximately the same as the frequency band (e.g., 2324 MHz-2341.5 MHz) of the RF satellite signal received from the satellite (not shown in FIG. 3), and is configured to suppress emissions of signals (e.g., noise, other RF signals broadcast by the satellite) at out-of-band frequencies. The satellite-signal receive antenna (not shown in FIG. 3), receiver circuitry (not shown in FIG. 3), master-unit circuitry 56, or remote-unit circuitry 60 may inject, undesirably, such out-of-band signals into the amplified RF signal generated by the power amplifier 64 due to, e.g., noise, circuit mismatches, circuit non-linearity, and circuit environmental (e.g., temperature, humidity) sensitivity. If not suppressed by the filter 72, such out-of-band signals, when broadcast by the retransmit antenna 36, can interfere with devices that are not configured to receive a retransmitted RF satellite signal from the retransmit antenna. Consequently, in the U.S., the Federal Communications Commission (FCC) may require the remote unit 52 to include the bandpass filter 72, and in other jurisdictions, organizations comparable to the FCC may impose a similar requirement.

The remote-unit circuitry 60 can be configured to control one or more operating parameters of the filter 72. For example, the remote-unit circuitry 60 can be configured to control the center frequency and width of the filter's passband to compensate for shifts in the center frequency and width due to, e.g., changes in temperature or age of the bandpass filter 72. And the remote-unit circuitry 60 can be configured to implement such control either dynamically (e.g., while the receiver and transmitter 70 is operating) or upon start-up or reset of the circuitry of the repeater 44.

Operation of the receiver and retransmitter 70 is described, according to an embodiment. For clarity, the operation of only a single repeater 44, and only a single remote unit 52 of that repeater, is described, it being understood that the other repeaters and remote units can operate in a similar manner.

The operation of all the components of the receiver and transmitter 70 is similar to the operation of these components as described above in conjunction with FIG. 2, except that the power amplifier 64 does not generate the output RF retransmission signal.

The bandpass filter 72 filters the amplified RF signal generated by the power amplifier 64 to generate the output RF retransmission signal, and provides the output RF signal to the retransmit antenna 36 via the output cable assembly 46. As described above, the filtering action of the bandpass filter 72 constrains the frequency content of the output RF signal to a desired frequency band (e.g., 2324 MHz-2341.5 MHz) by filtering out of the amplified RF signal out-of-band frequencies such as noise and RF signals in other bands).

Still referring to FIG. 3, alternate embodiments of the receiver and retransmitter 70 are contemplated. For example, some or all of the alternate embodiments described above for the satellite system 30 of FIG. 2 may be applicable to the receiver and transmitter 70. Furthermore, although shown as including a single stage, the bandpass filter 72 can include multiple filter stages. Moreover, the bandpass filter 72 can be an analog or a digital filter, and it, or the remote-unit circuitry 60, can include analog-to-digital (ADC) and digital-to-analog (DAC) converters as may be needed for signal conversion.

Figure 4:
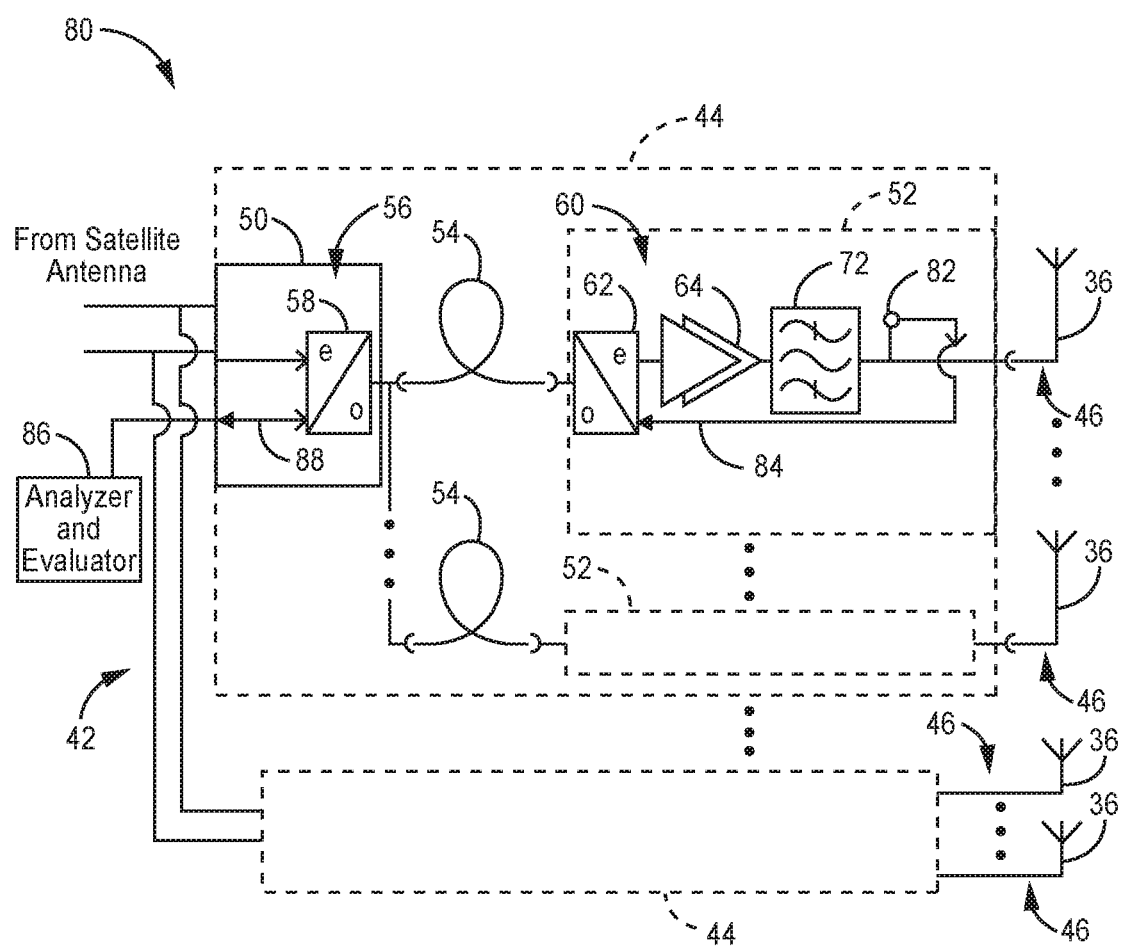
FIG. 4 is a diagram of a receiver and retransmitter that includes an optical terrestrial repeater having a remote unit with a single filtered signal-retransmission path and feedback of the output retransmission signal, according to an embodiment.

FIG. 4 is a diagram of a portion of a receiver and retransmitter 80, according to an embodiment. The receiver and retransmitter 80 is similar to the receiver and retransmitter 70 of FIG. 3 except that one or more of the remote units 52 of the receiver and retransmitter 80 each provides feedback of the respective output RF retransmission signal from the respective bandpass filter 72 to the respective master unit 50, according to an embodiment. In FIG. 4, like numbers are used to reference components that are common to FIGS. 2-4. And for clarity, the feedback associated with only one remote unit 52 of only one optical terrestrial signal repeater 44 is described, it being understood that the feedback associated with the other remote units of the described repeater and other repeaters is similar.

The remote-unit circuitry 60 of the remote unit 52 includes a decoupler circuit 82, which is configured to split the filtered RF signal from the bandpass filter 72 into an output RF retransmission electrical signal that propagates to the retransmit antenna 36, and an output RF feedback electrical signal on a feedback path 84. The output RF retransmission signal includes most of the energy of the filtered RF signal from the bandpass filter 72; for example, the output RF retransmission signal may include approximately 99.0%-99.9%, or even more, of the energy of the filtered RF signal, and the output RF feedback signal may include 0.10%-1.0%, or even less, of this energy. Therefore, the decoupler circuit 82 is configured to generate the output RF feedback signal in a manner that removes a suitably low, or negligible, amount of energy from the filtered RF signal.

The electro-opto converter 62 is configured to convert the output RF feedback signal from the decoupler circuit 82 into an optical feedback signal. For example, the converter 62 can include a laser diode configured to generate the optical feedback signal having a center wavelength, $\lambda_{cf}$, of approximately 1550 nm. For example, if the optical signal generated by the electro-opto converter 58 of the master unit 50 has a center wavelength, $\lambda_{cs}$, of approximately 1310 nm as described above in conjunction with FIG. 2, and if the optical fiber 54 is configured to allow propagation at both 1310 nm and 1550 nm (normal wavelength-division multiplexing (WDM)), then both the optical signal from the master unit 50 and the optical feedback signal from the remote unit 52 can propagate in opposite directions along a single optical fiber 54. To allow these different wavelengths to propagate along a single optical fiber 54, each of the electro-opto converter 58 of the master unit 50 and the electro-opto converter 62 of the remote unit 52 can include a respective laser, photodiode, and wavelength-division multiplexer/demultiplexer. In more detail, the electro-opto converter 58 can include a laser to generate an optical signal having a center wavelength, $\lambda_{cs}$, of approximately 1310 nm, a photodiode to receive the optical feedback having a center wavelength, $\lambda_{cf}$, of approximately 1550 nm, and a wavelength-division multiplexer/demultiplexer to multiplex the laser signal onto the optical fiber 54 and to demultiplex the optical feedback signal off of the optical fiber. Similarly, the electro-opto converter 62 can include a laser to generate a feedback optical signal having a center wavelength, $\lambda_{cf}$, of approximately 1550 nm, a photodiode to receive, from the master unit 50, the optical signal having a center wavelength, $\lambda_{cs}$, of approximately 1310 nm, and a wavelength-division multiplexer/demultiplexer to multiplex the laser signal onto the optical fiber 54 and to demultiplex the optical signal off of the optical fiber. Alternatively, because the signal from the master unit 50 propagates in one direction along the optical fiber 54 and the feedback signal propagates in the opposite direction along the optical fiber, both the master-unit signal and the feedback signal can have approximately the same wavelength (e.g., both signals can have the same center wavelength 1310 nm or 1550 nm).

The electro-opto converter 58 is configured to convert the optical feedback signal into an electrical feedback signal, and to provide the electrical feedback signal to an analyzer-and-evaluator circuit 86 via a feedback path 88. For example, as described above, the electro-opto converter 58 can include a photodiode to perform such conversion of the optical feedback signal.

The analyzer-and-evaluator circuit 86 is part of, or separate from, the master unit 50, and configured to determine, from the electrical feedback signal on the feedback path 88, the characteristics (e.g., frequency content, power level, level of distortion, SNR, group delay) of the output RF retransmission signal, and whether these characteristics are within respective suitable ranges. If the analyzer-and-evaluator 86 circuit is separate from the master unit 50, then multiple master units of a repeater 44 may share a single analyzer-and-evaluator circuit.

If the analyzer-and-evaluator circuit 86 determines that the one or more characteristics of the output RF retransmission signal are outside of respective suitable ranges, then the analyzer-and-evaluator circuit is configured to generate one or more output electrical control signals for the purpose of controlling one or more operating parameters of the master-unit circuitry 56 and the remote-unit circuitry 60. For example, the analyzer-and-evaluator circuit 86 can be configured to control, via the one or more control signals, the gain of the power amplifier 64, the center frequency and width of the passband of the bandpass filter 72, the gain of the bandpass filter, and, if the bandpass filter is a digital filter, the filter coefficients, to compensate for shifts in the power level, frequency content, and group delay of the output RF retransmission signal due to, e.g., changes in temperature or age of the remote-unit circuitry. And the analyzer-and-evaluator circuit 86 can be configured to perform such control dynamically or at start up or reset of the circuitry of the repeater 44.

The analyzer-and-evaluator circuit 86 is further configured to provide the one or more output control signals to the electro-opto converter 58, which converts the electrical control signals (e.g., with one or more respective laser diodes) into respective optical control signals having center wavelengths that are different from the center wavelengths of the optical satellite signal and the optical feedback signal. Alternatively, because the control signals typically have relatively low bandwidth/bit rates, the master-unit circuitry 56 can be configured to modulate (digitally or in an analog fashion) an electrical carrier signal with the one or more control signals using, for example, phase-shift keying (PSK) or frequency-shift keying (FSK). The master-unit circuitry 56 can be configured to combine the received satellite signal and the modulated carrier signal, and the electro-opto converter 58 can be configured to convert this combined electrical signal into a single optical signal, and to provide the single optical signal to the optical fiber 54. Because the one or more control signals and the received satellite signal are at significantly different frequencies, the remote-unit circuitry 60 can separate the one or more control signals from the satellite signal with filtering. This latter technique (modulating a single carrier with all of the control signals and combining the modulated carrier and the received satellite signal into one signal) can avoid the expense and complexity of including multiple lasers in the electro-opto converter 58.

The one or more optical control signals propagate over the optical fiber 54 to the electro-opto converter 62, which converts (e.g., with a photodiode) the one or more optical control signals into a corresponding one or more input electrical control signals.

Per above, the remote-unit circuitry 60 is configured to adjust the parameters of the power amplifier 64 and bandpass filter 72 (and possibly other components of the remote-unit circuitry such as the electro-opto converter 62 and the decoupler circuit 82) in response to the one or more input electrical control signals.

Including the feedback path 84 in the remote unit 52 can make the remote unit more suitable for some applications. For example, effectively moving the circuitry that analyzes the characteristics of the power amplifier 64 and filter 72 from the remote unit 52 to the analyzer-and-evaluator circuit 86 can reduce at least one of the size, weight, cost, and heat output of the remote unit, and, therefore, can make the remote unit more suitable for installation and use in or on more types of locations. Furthermore, because the remote unit 52 often is located outdoors, and, therefore, often experiences a more variable environment than the master unit 50, which typically is located indoors, the analyzer-and-evaluator circuitry 86 is likely to analyze the characteristics of the power amplifier 64 and bandpass filter 72 (and possibly other components of the remote-unit circuitry 60) more accurately than if located in the remote unit because the analyzer-and-evaluator circuit is likely to experience smaller operational variations due to environmental factors such as temperature and humidity. Moreover, it is typically easier and less expensive to repair, upgrade, or replace the analyzer-and-evaluator circuit 86 if the analyzer-and-evaluator circuit is part of, or is located in the vicinity of, the master unit 50 because the master unit typically is located in a more convenient and accessible location than the remote unit.

And if an application calls for no feedback, then the decoupler circuit 82, feedback path 84, and other feedback components are configured to be disabled.

Still referring to FIG. 4, operation of the receiver and retransmitter 80 is described, according to an embodiment. For clarity, the operation of only a single master unit 50 and a single remote unit 52 of a single repeater 44 are described, it being understood that the other master units and other remote units of the described repeater, and the master units and remote units of the undescribed repeaters, can operate in a similar manner.

The master-unit circuitry 56 of the master unit 50 optionally amplifies, modulates, transcodes or otherwise encodes the preprocessed RF satellite signal from the satellite-signal receive antenna and receiver circuit (neither shown in FIG. 4), and the electro-opto converter 58 converts the preprocessed (and optionally modified) RF signal to an optical signal and provides the optical signal to the optical fiber 54. For example, the electro-optical converter 58 can be configured to generate the optical signal at a center wavelength, $\lambda_c$, of approximately 1310 nm as described above.

Next, the opto-electro converter 62 of the remote unit 52 converts the optical signal into an intermediate electrical RF signal, the remote-unit circuitry 60 optionally demodulates, transcodes, or decodes the intermediate RF electrical signal, and the amplifier 64 amplifies the intermediate (and optionally modified) RF signal and provides the amplified RF signal to the bandpass filter 72.

Then, the bandpass filter 72 filters the amplified RF signal to generate an output RF retransmission signal, which the filter provides to the retransmit antenna 36 for retransmission.

Next, the retransmit antenna 36 generates a retransmission RF satellite signal from the output RF retransmission signal, and broadcasts the retransmission RF satellite signal.

The retransmission RF satellite signal carries the same information (e.g., voice data) as the RF satellite signal broadcast by the satellite (not shown in FIG. 4).

Other than carrying the same information, the retransmission RF satellite signal broadcast by the retransmit antenna 36 can be (but for power level) the same as the RF satellite signal broadcast by the satellite 38, or can have one or more different parameters (e.g., coding, modulation, form (digital or analog)) than the RF satellite signal.

Furthermore, the decoupler circuit 82 directs a portion of the filtered RF signal from the bandpass filter 72 to the feedback path 84 as an output electrical feedback signal.

Then, the electro-opto converter 62 converts the output electrical feedback signal into an optical feedback signal (e.g., at a center wavelength of 1550 nm), and provides the optical feedback signal to the optical fiber 54.

Next, the electro-opto converter 58 converts the optical feedback signal from the optical fiber 54 into an input electrical feedback signal, and provides the input electrical feedback signal to the analyzer-and-evaluator circuit 86.

Then, the analyzer-and-evaluator circuit 86 determines from the input electrical feedback signal whether the parameters of any of the remote-unit components (e.g., the electro-opto converter 62, the power amplifier 64, the bandpass filter 72, the decoupler circuit 82) or any of the master-unit components need adjustment.

If the analyzer-and-evaluator circuit 86 determines that one or more of these parameters need adjustment, then the analyzer-and-evaluator circuit generates an output electrical control signal, and provides the control signal to the master unit 50.

If the control signal is configured to change a parameter of a component of the master unit 50, then the master-unit circuitry 56 determines whether a component or components is/are identified by the control signal, and changes the parameter(s) of the identified component(s) in response to the control signal.

Next, the master unit 50 couples the control signal to the electro-optic converter 58, which converts the control signal to an optical control signal, and which provides the optical control signal to the optical fiber 54.

Then, the electro-opto converter 62 converts the optical control signal to an input electrical control signal.

If the input electrical control signal is configured to change a parameter of a component of the remote unit 52, then the remote-unit circuitry 60 determines whether a component or components is/are identified by the control signal, and changes the parameter(s) of the identified component(s) (e.g., the power amplifier 64, the bandpass filter 72) in response to the control signal.

The master unit 50, remote unit 52, and analyzer-and-evaluator circuit 86 can repeat the above-described feedback-related and control-related steps one or more times maintain the operating characteristics of the master unit and remote unit within acceptable ranges.

Still referring to FIG. 4, alternate embodiments of the receiver and retransmitter 80 are contemplated. For example, some or all of the alternate embodiments described above for the satellite system 30 of FIG. 2 and of the receiver and retransmitter 70 of FIG. 3 may be applicable to the receiver and retransmitter 80. Furthermore, instead of generating a single control signal for all parameter changes, the analyzer-and-evaluator circuit 86 can be configured to generate one control signal per parameter change or one control signal per component having a parameter to be changed.

Figure 5:
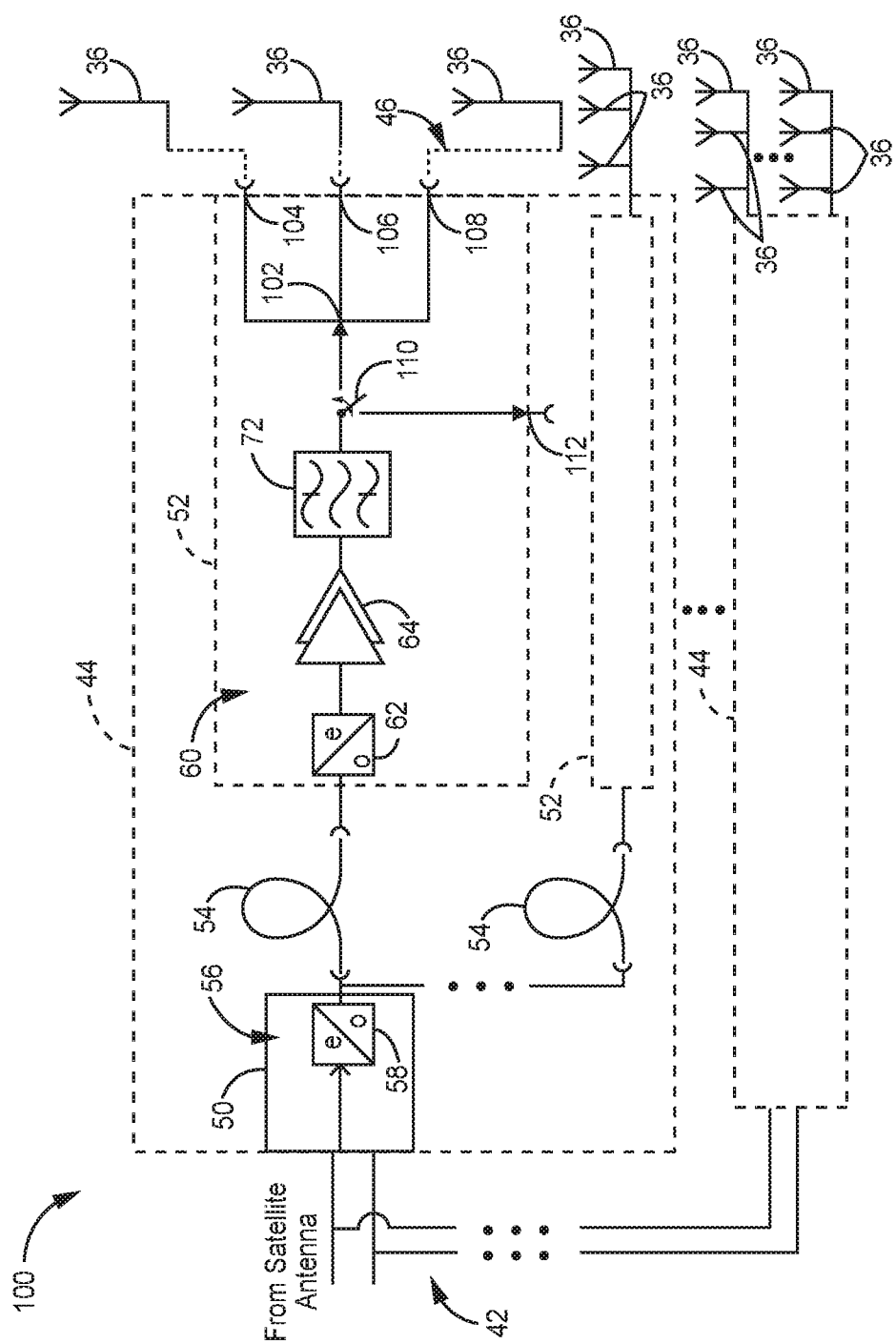
FIG. 5 is a diagram of a receiver and retransmitter that includes an optical terrestrial repeater having a remote unit with a selectable number of signal-retransmission paths that share a bandpass filter, according to an embodiment.

FIG. 5 is a diagram of a portion of a receiver and retransmitter 100, according to an embodiment. The receiver and retransmitter 100 is similar to the receiver and retransmitter 70 of FIG. 3 except that the remote units 52 of the receiver and transmitter 100 each split the filtered RF signal generated by the bandpass filter 72 into multiple (three in the described embodiment) output RF retransmission signals for respective retransmit antennas 36. In FIG. 5, like numbers are used to reference components that are common to FIGS. 3-5.

As described above, the each repeater 44 includes a splitter circuit 102, which divides the filtered RF signal from the bandpass filter 72 into multiple, here three, approximately coherent and correlated output RF retransmission signals, and provides the output RF retransmission signals to output antenna ports 104, 106, and 108, respectively. The splitter circuit 102 can be a conventional splitter circuit having suitable characteristics such as linearity and attenuation.

The output RF retransmission signals ideally have the same power, frequency content, phases, and group delay, although, in actuality, the output RF signals may have approximately the same power (e.g., up to approximately 2 W), frequency content, phases, and group delay. Such approximate coherency and correlation can be relatively easy to achieve because the output RF retransmission signals are derived from a single filtered RF signal from a single bandpass filter 72.

In an example, the multiple, here three, retransmit antennas 36 can have respective transmit characteristics (e.g., directivity) such that together, the antennas form a transmit beam having suitable power and beam characteristics while effectively retransmitting a single output RF satellite signal.

Furthermore, a system designer or installer can configure the receiver and retransmitter 100 for a single retransmit antenna 36 by coupling each RF output port 104, 106, and 108 to a signal combiner (not shown in FIG. 5) external to the receiver and transmitter, and by coupling the RF output port of the external signal combiner to the single retransmit antenna. Or, the designer or installer can configure the receiver and transmitter 100 for fewer than the total number of possible retransmit antennas 36 by combining groups of the output RF retransmission signals with respective external signal combiners.

To allow effective combining of all of the output RF retransmission signals without an external signal combiner, the receiver and retransmitter 100 can include an RF switch 110, which is configured to selectively couple the filtered RF signal from the bandpass filter 72 to the signal divider 102 (e.g., "split mode") or to a single-antenna output port 112 (e.g., "bypass mode"). The RF switch 110 can be software, hardware, or manually controlled, and can be a transistor, or a group of transistors, configured to provide suitable linearity, group delay, and other characteristics. Furthermore, the RF switch 110 can be configured for toggling dynamically during operation of the receiver and transmitter 100, or during initialization or reset of the receiver and transmitter before the receiver and transmitter commences operation.

Still referring to FIG. 5, alternate embodiments of the receiver and retransmitter 100 are contemplated. For example, some or all of the alternate embodiments described above for the satellite system 30 of FIG. 2 and of the receivers and retransmitters 70 and 80 of FIGS. 3-4 may be applicable to the receiver and retransmitter 100. Furthermore, instead of generating multiple correlated and coherent output RF retransmission signals from the filtered RF signal generated by the bandpass filter 72, the splitter circuit 102 can be configured to generate one or more of the output RF retransmission signals having different characteristics (e.g., power, phase, group delay) such that the retransmit antennas 36 generate a retransmit beam having characteristics (e.g., beam direction, beam width) suitable for a particular application. And, although not shown in FIG. 5, the receiver and retransmitter 100 can include the feedback decoupler circuit 82, the feedback path 84, and the analyzer-and-evaluator circuit 86, and otherwise can be configured for feedback, as described above in conjunction with FIG. 4. For example, a single feedback decoupler circuit 82 can be coupled to the output of the bandpass filter 72 before the RF switch 110, or respective feedback decoupler circuits can be coupled to one or more of the outputs of the splitter circuit 102. In the latter implementation, multiple decoupler circuits 82 are configured to feed their respective output electrical feedback signals into a respective feedback paths 84, and the electro-opto converter 62 can convert each output feedback signal into a respective optical feedback signal, or the electro-opto converter, or another portion of the remote-unit circuitry 60, can combine the output feedback signals into a single optical feedback signal.

Figure 6:
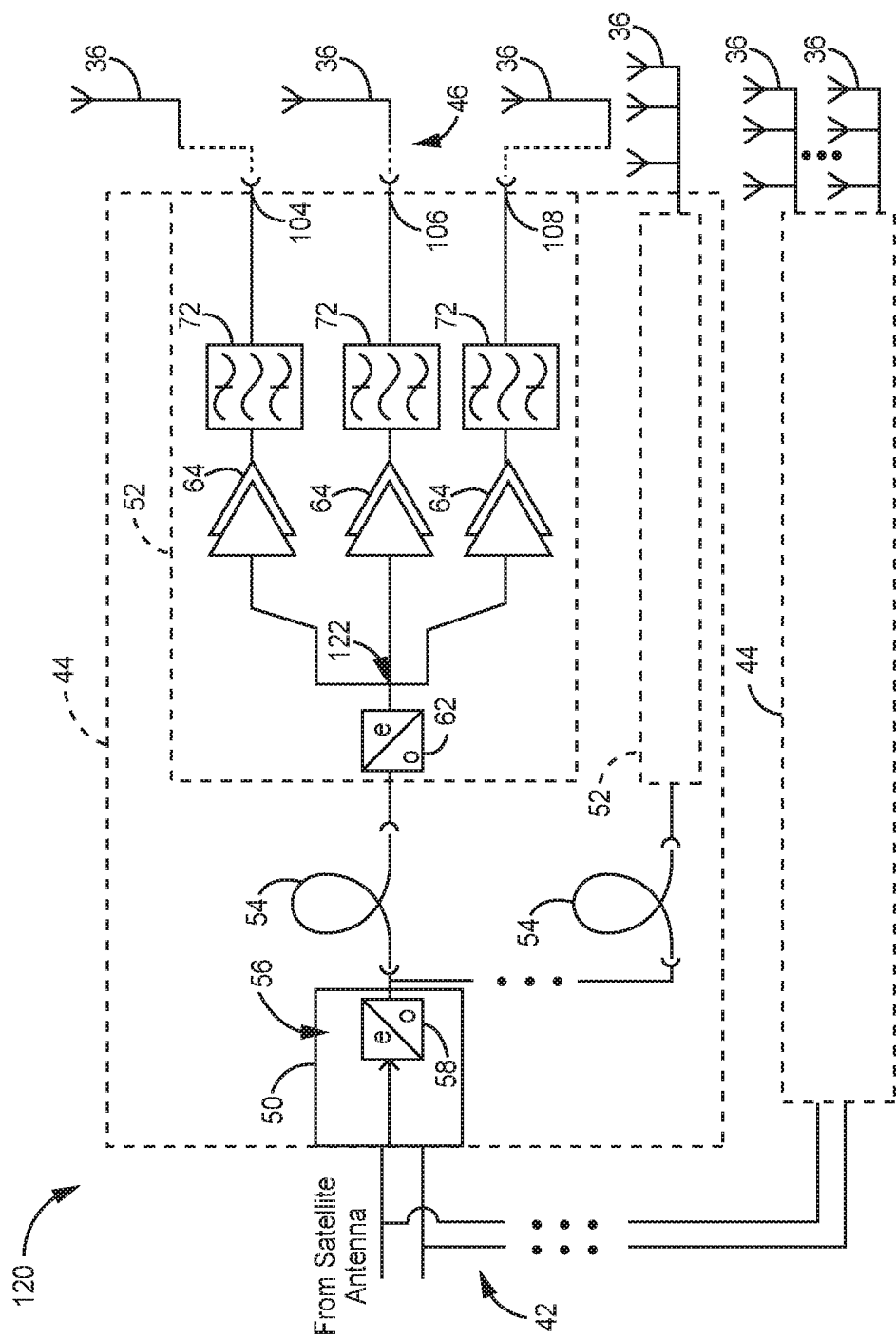
FIG. 6 is a diagram of a receiver and retransmitter that includes an optical terrestrial repeater having a remote unit with multiple signal-retransmission paths each including a respective bandpass filter, according to an embodiment.

FIG. 6 is a diagram of a portion of a receiver and retransmitter 120, according to an embodiment. The receiver and retransmitter 120 is similar to the receiver and retransmitter 70 of FIG. 3 except that the remote units 52 of the receiver and retransmitter 120 each split the intermediate RF signal generated by the electro-opto converter circuit 62 into multiple (three in the described embodiment) intermediate RF signals for respective power amplifiers 64. In FIG. 6, like numbers are used to reference components that are common to FIGS. 3-6.

As described above, each repeater 44 includes a respective splitter circuit 122, which divides the intermediate RF signal from the electro-opto converter 62 into multiple, here three, approximately coherent and correlated intermediate RF signals, and which provides these signals to respective power amplifiers 64, bandpass filters 72, and to the respective output antenna ports 104, 106, and 108. The splitter circuit 122 can be a conventional splitter having suitable characteristics such as low phase imbalance and low amplitude imbalance. The power amplifiers 64 can be matched (e.g., be located on the same integrated-circuit die, or at least in the same integrated-circuit package) so as to have approximately the same characteristics such as gain, bandwidth, and group delay. Similarly, the bandpass filters 72 can be matched (e.g., can be matched cavity filters, can be located on the same integrated-circuit die, or at least in the same integrated-circuit package) so as to have approximately the same characteristics such as gain, bandwidth, and group delay. And other circuit components along the RF signal paths from the splitter circuit 122 can be similarly matched.

The intermediate RF signals from the splitter circuit 122 ideally have the same power, frequency content, phases, and group delay, although, in actuality, the intermediate RF signals may have approximately the same power, frequency content, phases, and group delay.

The multiple, here three, retransmit antennas 36 can have respective transmit characteristics (e.g., directivity) such that together, the antennas form a transmit beam having suitable power and beam characteristics while effectively retransmitting a single output RF retransmitted satellite signal.

Furthermore, a system designer or installer can configure the receiver and retransmitter 120 for a single retransmit antenna 36 by coupling each RF output port 104, 106, and 108 to a signal combiner (not shown in FIG. 6) external to the receiver and transmitter, and by coupling the RF output port of the external signal combiner to the single retransmit antenna. Or, the designer or installer can configure the receiver and transmitter 120 for fewer than the total number of possible retransmit antennas 36 by combining groups of the output RF retransmission signals with respective external signal combiners.

To allow effective combining of all of the output RF retransmission signals without an external signal combiner, the receiver and retransmitter 120 can include an RF switch (not shown in FIG. 6), which is configured to selectively couple the intermediate RF signal from the electro-opto converter 62 to the signal divider 122 (e.g., "split mode") or to a single power amplifier 64 (e.g., "bypass mode"). The RF switch can be software, hardware, or manually controlled, and can be a transistor, or a group of transistors, configured to provide suitable linearity, group delay, and other characteristics. Furthermore, the RF switch can be configured for toggling dynamically during operation of the receiver and retransmitter 120, or during initialization or reset of the receiver and retransmitter before the receiver and retransmitter commences operation. Although operating in the bypass mode may not allow an increase in the total output signal power to the retransmit antennas 36, operating in the bypass mode can allow an increase in SNR and gain to the selected retransmit antenna.

As compared to the receiver and retransmitter 100 of FIG. 5, the receiver and retransmitter 120 of FIG. 6 may generate output RF retransmission signals having higher output power, but the receiver and retransmitter 100 may generate better correlated, and more coherent, output RF retransmission signals. Because the splitter circuit 122 of the receiver and retransmitter 120 is configured to split a lower-power signal (the intermediate RF signal from the electro-opto converter circuit 62) than the splitter circuit 102 of the receiver and retransmitter 100, the linearity and power-handling requirements of the splitter circuit 122 can be significantly relaxed relative to the linearity and power-handling requirements of the splitter circuit 102; therefore, the splitter circuit 122 may be less expensive and less complex than the splitter circuit 102. And because the splitter circuit 102 of the receiver and retransmitter 100 is configured to split an RF signal from a single amplifier 64 and filter 72, the output RF retransmission signals generated by the splitter circuit 102 may be more correlated and coherent (e.g., may have more closely matched powers, frequency content, phases, and group delays) than the output RF retransmission signals respectively generated by the multiple filters 72 of FIG. 6.

Still referring to FIG. 6, alternate embodiments of the receiver and retransmitter 120 are contemplated. For example, some or all of the alternate embodiments described above for the satellite system 30 of FIG. 2 and of the receivers and retransmitters 70, 80, and 100 of FIGS. 3-5 may be applicable to the receiver and retransmitter 120. Furthermore, instead of being closely matched to generate multiple correlated and coherent output RF retransmission signals from the intermediate RF signal generated by the electro-opto converter 62, the amplifiers 64 and bandpass filters 72 can be configured to generate one or more of the output RF retransmission signals having different characteristics (e.g., power, phase, group delay) such that the retransmit antennas 36 generate a retransmit beam having characteristics (e.g., beam direction, beam width) suitable for a particular application.

Figure 7:
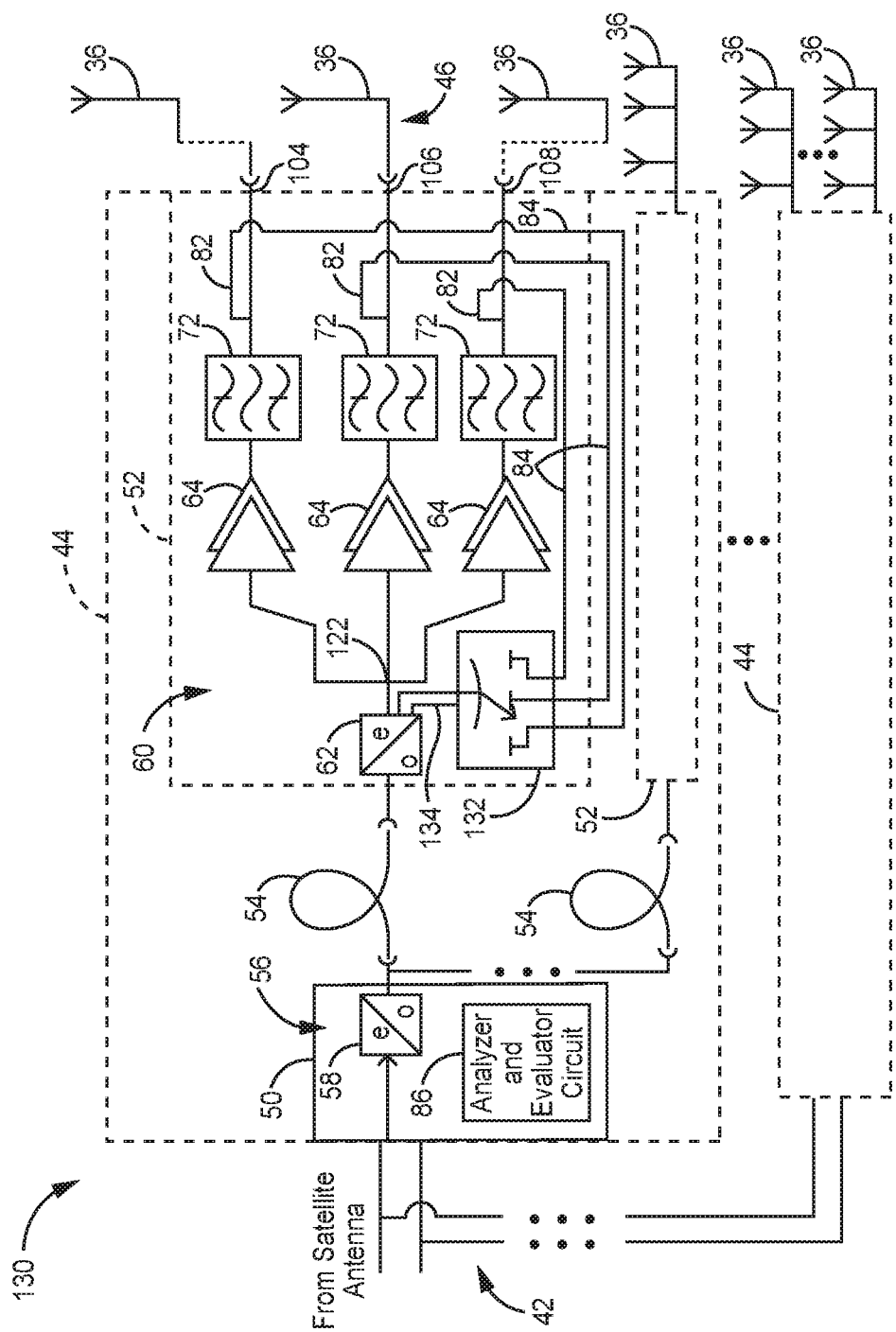
FIG. 7 is a diagram of a receiver and retransmitter that includes an optical terrestrial repeater having a remote unit with multiple signal-retransmission paths each including a respective bandpass filter, and with feedback of the multiple output retransmission signals, according to an embodiment.

FIG. 7 is a diagram of a portion of a receiver and retransmitter 130, according to an embodiment. The receiver and retransmitter 130 is similar to the receiver and retransmitter 120 of FIG. 6 except that each remote unit 52 of the receiver and retransmitter 130 provides feedback of the output RF retransmission signals at the antenna output nodes 102, 104, and 106. For clarity, only a single remote unit 52 of a single repeater 44 is described in detail, it being understood that the other remote units of the described repeater, and the other repeaters, can be similar. Furthermore, in FIG. 7, like numbers are used to reference components that are common to FIGS. 3-6.

The repeater 44 includes a respective feedback decoupler circuit 82 and respective feedback path 84 for each bandpass filter 72, and includes the analyzer-and-evaluator circuit 86.

In one example, the electro-opto converter 62 is configured to convert each electrical feedback signal on the paths 84 into a respective optical feedback signal at a respective wavelength, or the electro-opto converter 62, or another portion of the remote-unit circuitry 60, can be configured to combine the electrical feedback signals into a single optical feedback signal. The electro-opto converter 62 can include a wavelength-division multiplexer/demultiplexer to multiplex the optical feedback signal(s) onto the optical fiber 54 and to demultiplex the satellite signal and the one or more control signals from the optical fiber. Similarly, the analyzer-and-evaluator circuit 86 can be configured to generate a single control signal or multiple control signals, one control signal for each RF signal path including a respective amplifier 64 and a respective filter 72, or one control signal for each component (e.g., amplifier, filter) of each such RF signal path as described above in conjunction with FIG. 4.

In another example, to reduce the cost and complexity of the remote-unit 52 (e.g., by eliminating the need for a wavelength-division multiplexer/demultiplexer and multiple lasers), the remote-unit circuitry 60 includes a switch circuit 132, which is configured to time-division multiplex the electrical feedback signals on the paths 84 in response to a time-multiplex control signal from the master-unit 50 on a path 134. That is, in response to the time-multiplex control signal on the path 134, the switch circuit 132 couples a first feedback path 84 to the electro-opto converter 62 for a period of time (e.g., in a range of approximately 1.0 millisecond (ms) to 10 seconds (s)), then couples a second feedback path 84 to the electro-opto converter for approximately the same period of time, and so on, until the switch circuit 132 has sequentially coupled all feedback paths to the electro-opto converter. And the switch circuit 132 continues to repeat this coupling sequence as long as the control signal on the path 134 instructs the switch circuit to do so. The electro-opto converter 62 is configured to convert the time-multiplexed electrical feedback signal from the switch circuit 132 into a single optical feedback signal, and to couple the single optical feedback signal onto the optical fiber 54. The analyzer-and-evaluator circuit 86, or another portion of the master-unit circuitry 56, is configured to generate an electrical time-multiplex control signal, and the electro-opto converter 58 is configured to convert the electrical time-multiplex control signal into an optical time-multiplex control signal and to couple the optical time-multiplex control signal onto the optical fiber 54. Because the frequencies of the modulated overall electrical control signal, including the time-multiplex and other control signals, are significantly lower, and different, respectively, than the frequencies of the received satellite signal, the modulated overall electrical control signal can easily be combined with the satellite signal as described above in conjunction with FIG. 4. And the electro-opto converter 62 is configured to convert the single optical signal from the optical fiber 54 into an electrical signal, and the remote-unit circuitry 60 is configured to separate the electrical signal into the satellite signal and the one or more control signals including the time-multiplex control signal on the path 134.

The feedback circuitry of the receiver and retransmitter 130 is otherwise configured and otherwise operates as described above in conjunction with FIG. 4, and the other circuitry of the receiver and retransmitter 130 is configured and operates as describe above in conjunction with FIG. 6.

Still referring to FIG. 7, alternate embodiments of the receiver and retransmitter 130 are contemplated. For example, some or all of the alternate embodiments described above for the satellite system 30 of FIG. 2 and of the receivers and retransmitters 70, 80, 100, and 120 of FIGS. 3-6 may be applicable to the receiver and retransmitter 130. Furthermore, although described as being configured to provide feedback of all the output RF retransmission signals at the output antenna ports 104, 106, and 106, each repeater 44 can be configured to provide feedback for only one or more, but not all, of the output RF retransmission signals.

Figure 8:
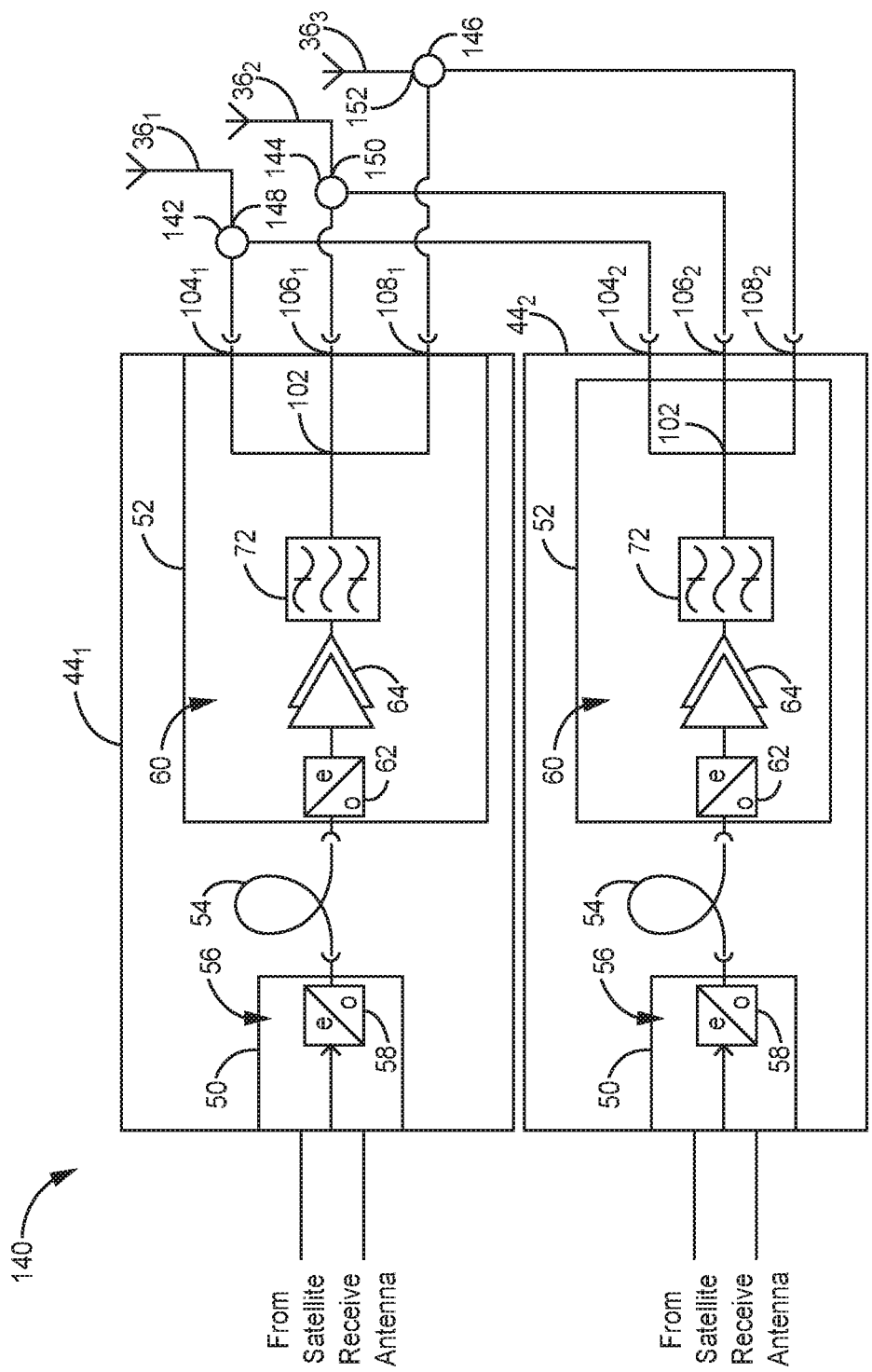
FIG. 8 is a diagram of two of the optical signal repeaters of FIG. 5 sharing retransmit antennas, according to an embodiment.

FIG. 8 is a diagram of a subsystem 140, which includes multiple optical terrestrial repeaters (here two) $44_1$-$44_2$ and one or more (here three) shared retransmit antennas $36_1$-$36_3$, according to an embodiment. Sharing retransmission antennas can save cost and space as compared to each repeater 44 being coupled to respective, unshared, retransmission antennas. In FIG. 8, like numbers reference components common to FIGS. 2-8.

The subsystem 140 can include a single receiver and retransmitter, and the shared repeaters 44 can be part of this receiver and transmitter.

Alternatively, the subsystem 140 can include multiple receivers and transmitters, and each of the shared repeaters 44 can be part of a respective one of the receivers and transmitters.

The repeaters $44_1$-$44_2$ are each configured to generate, on their respective output nodes 104, 106, and 108, respective output RF retransmission signals in respective frequency bands, or in respective channels within a same frequency band. For example, the repeater $44_1$ can be configured to generate, on a first channel of the L band, output RF retransmission radio signals, and the repeater $44_2$ can be configured to generate, on a second channel of the L band, output RF retransmission mobile-communication signals. Or, the repeater $44_1$ can be configured to generate, in a first approximate frequency band of 2324 MHz-2341.5 MHz, output RF retransmission radio signals, and the repeater $44_2$ can be configured to generate, in a second approximate frequency band of 2350 MHz-2360 MHz, output RF retransmission mobile-communication signals.

The shared retransmit antennas 36 are configured to have bandwidths wide enough to accommodate the frequencies of the output RF signals from all of the repeaters 44 that share the retransmit antennas.

The subsystem 140 also includes signal-combiner circuits 142, 144, and 146, one for each shared retransmit antenna 36. The signal-combiner circuits 142, 144, and 146 can be part of a receiver and retransmitter, or can be separate therefrom.

The signal-combiner circuit 142 is configured to combine, in a conventional manner, the output RF retransmission signals from the output nodes $104_1$ and $104_2$ into a single output RF retransmission signal on an output node 148, which is coupled to a first retransmit antenna $36_1$. The combined output RF retransmission signal on the output node 148 includes the frequencies of, and the information carried by, the output RF retransmission signals on the output nodes $104_1$ and $104_2$.

The signal-combiner circuit 144 is configured to combine, in a conventional manner, the output RF transmission signals from the output nodes $106_1$ and $106_2$ into a single output RF retransmission signal on an output node 150, which is coupled to a second retransmit antenna $36_2$. The combined output RF signal on the output node 150 includes the frequencies of, and the information carried by, the output RF retransmission signals on the output nodes $106_1$ and $106_2$.

And the signal-combiner circuit 146 is configured to combine, in a conventional manner, the output RF retransmission signals from the output nodes $108_1$ and $108_2$ into a single output RF retransmission signal on an output node 152, which is coupled to a third retransmit antenna $36_3$. The combined output RF retransmission signal on the node 152 includes the frequencies of, and the information carried by, the output RF transmission signals on the output nodes $108_1$ and $108_2$.

Operation of the system 140 is described, according to an embodiment.

The repeaters $44_1$ and $44_2$ operate in a manner similar to that described above for the repeaters 44 of FIG. 5.

The signal combiner circuit 142 combines the output RF retransmission signals on the nodes $104_1$ and $104_2$ into a first combined output RF retransmission signal on the node 148, and the first retransmit antenna $36_1$ transmits, in response to the first combined output RF retransmission signal, a first combined satellite retransmission signal.

The signal combiner circuit 144 combines the output RF retransmission signals on the nodes $106_1$ and $106_2$ into a second combined output RF retransmission signal on the node 150, and the second retransmit antenna $36_2$ transmits, in response to the second combined output RF retransmission signal, a second combined satellite retransmission signal.

And the signal combiner circuit 146 combines the output RF retransmission signals on the nodes $108_1$ and $108_2$ into a third combined output RF retransmission signal on the node 152, and the third retransmit antenna $36_3$ transmits, in response to the third combined output RF signal, a third combined satellite retransmission signal.

Depending on the positions, orientations, and transmission characteristics of the retransmit antennas $36_1$-$36_3$, the first, second, and third combined satellite retransmission signals may combine to form a transmit beam having desired characteristics such as power and direction.

Still referring to FIG. 8, alternate embodiments of the system 140 are contemplated. For example, some or all of the alternate embodiments described above for the satellite system 30 of FIG. 2 and of the receivers and retransmitters 70, 80, 100, 120, and 130 of FIGS. 3-7 may be applicable to the system 140. Furthermore, although described as including three shared retransmission antennas 36, the system 140 can include one, two, or more than three shared retransmission antennas. Moreover, one or more of the repeaters 44 can be configured to provide feedback as described above in conjunction with FIGS. 4 and 7.

EXAMPLE EMBODIMENTS

Example 1 includes a signal repeater, comprising: a master unit including master-unit circuitry configured to receive an input electrical signal from a satellite-signal-receive antenna, and to convert the input electrical signal into an optical signal; and a remote unit including remote-unit circuitry configured to convert the optical signal into an intermediate electrical signal, to amplify the intermediate electrical signal to generate an output electrical signal, and to couple the output electrical signal to a retransmission antenna.

Example 2 includes the signal repeater of Example 1, further comprising an optical fiber configured to couple the optical signal from the master unit to the remote unit.

Example 3 includes the signal repeater of any of Examples 2-3 wherein the optical fiber is configured to attenuate the optical signal no more than approximately Example 0.5 decibels per kilometer.

Example 4 includes the signal repeater of any of Examples 1-3 wherein the master-unit circuitry is further configured to receive an input electrical signal having a frequency within a frequency band of approximately 2324 MHz to 2341.5 MHz.

Example 5 includes the signal repeater of any of Examples 1-4 wherein the master-unit circuitry is further configured: to amplify the input electrical signal; and to convert the amplified electrical signal into the optical signal.

Example 6 includes the signal repeater of any of Examples 1-5 wherein: the input electrical signal is encoded according to a code; and the master-unit circuitry is further configured to encode the input electrical signal according to a different code; and to convert the different-coded electrical signal into the optical signal.

Example 7 includes the signal repeater of any of Examples 1-6 wherein the remote-unit circuitry further includes: an opto-electrical converter configured to convert the optical signal into the intermediate electrical signal; an amplifier configured to amplify the intermediate electrical signal; and a bandpass filter configured to filter the amplified electrical signal to generate the output electrical signal, and to couple the output electrical signal to a retransmission antenna.

Example 8 includes the signal repeater of any of Examples 1-7 wherein the remote-unit circuitry further includes: an opto-electrical converter configured to convert the optical signal into the intermediate electrical signal; an amplifier configured to amplify the intermediate electrical signal; a bandpass filter configured to filter the amplified electrical signal; and a signal divider configured to generate, from the filtered electrical signal, output electrical signals, and to couple each of the output electrical signals to a respective retransmission antenna.

Example 9 includes the signal repeater of any of Examples 1-6 wherein the remote-unit circuitry further includes: an opto-electrical converter configured to convert the optical signal into the intermediate electrical signal; an amplifier configured to amplify the intermediate electrical signal; a bandpass filter configured to filter the amplified electrical signal; a higher-power output port configured to be coupled to a retransmission antenna; lower-power output ports each configured to be coupled to a respective retransmission antenna; a signal divider configured to generate, from the filtered electrical signal, output electrical signals, and to couple each of the output electrical signals to a respective one of the lower-power output ports; and a switch configured to selectively couple the filtered electrical signal to the higher-power output port or to the signal divider.

Example 10 includes the signal repeater of any of Examples 1-9 wherein the remote-unit circuitry further includes: an opto-electrical converter configured to convert the optical signal into the intermediate electrical signal; a signal divider configured to generate, from the intermediate electrical signal, multiple lower-power electrical signals; amplifiers each configured to amplify a respective one of the lower-power electrical signals; and bandpass filters each configured to filter a respective one of the amplified electrical signals to generate a respective output electrical signal, and to couple the respective output electrical signal to a respective retransmission antenna.

Example 11 includes the signal repeater of any of Examples 1-10 wherein: the remote-unit circuitry is further configured to generate an output electrical feedback signal from the output electrical signal, to convert the output electrical feedback signal into an optical feedback signal, and to provide the optical feedback signal to the master unit; and the master-unit circuitry is further configured to receive the optical feedback signal, and to convert the optical feedback signal into an input electrical feedback signal.

Example 12 includes the signal repeater of any of Examples 1-11 wherein: the remote-unit circuitry is further configured to generate an output electrical feedback signal from the output electrical signal, to convert the output electrical feedback signal to an optical feedback signal, to provide the optical feedback signal to the master unit; to receive an optical control signal from the master unit, to convert the optical control signal to an input electrical control signal, and to alter the configuration of the remote-unit circuitry in response to the input electrical control signal; and the master-unit circuitry is further configured to receive the optical feedback signal from the remote unit, to convert the optical feedback signal to an input electrical feedback signal, to provide the input electrical feedback signal to an analyzer circuit configured to generate an output electrical control signal in response to the input electrical feedback signal, to convert the output electrical control signal into the optical control signal, and to provide the optical control signal to the remote unit.

Example 13 includes the signal repeater of any of Examples 1-12 wherein: the remote-unit circuitry further includes an opto-electrical converter configured to convert the optical signal into the intermediate electrical signal, to convert output electrical feedback signals into respective optical feedback signals, to provide the optical feedback signals to the master unit, and to convert optical control signals from master unit into respective input electrical control signals, a signal divider configured to generate, from the intermediate electrical signal, multiple lower-power electrical signals, amplifiers each having a respective configuration parameter and configured to amplify a respective one of the lower-power electrical signals, bandpass filters each having a respective configuration parameter and configured to filter a respective one of the amplified electrical signals to generate a respective output electrical signal, and to couple the respective output electrical signal to a respective retransmission antenna, feedback generators each configured to generate a respective one of the output electrical feedback signals from a respective one of the output electrical signals, and at least one of the power amplifiers and bandpass filters configured to alter the configuration parameter in response to a respective one of the input electrical control signals; and the master-unit circuitry is further configured to receive the optical feedback signals, to convert the optical feedback signals into respective input electrical feedback signals, to provide the input electrical feedback signals to an analyzer circuit configured to generate output electrical control signals in response to the input electrical feedback signals, respectively, to convert the output electrical control signals into optical control signals, respectively, and to provide the optical control signals to the remote unit.

Example 14 includes a master unit for a signal repeater, the master unit comprising: a processing circuit configured to process an input electrical signal from a satellite-signal-receive antenna; and a converter circuit configured to convert the processed electrical signal into an optical signal, and to provide the optical signal to a remote unit for the signal repeater via an optical path.

Example 15 includes the master unit of Example 14, further comprising: wherein the processed electrical signal is encoded according to a code; a transcoding circuit configured to encode the processed electrical signal according to a different code; and wherein the converter circuit is configured to convert the processed electrical signal encoded according to the different code into the optical signal.

Example 16 includes a remote unit for a signal repeater, the remote unit comprising: a converter circuit configured to convert an optical signal from a master unit of the signal repeater into an intermediate electrical signal; and an amplifier circuit configured to amplify the intermediate electrical signal, and to couple the amplified electrical signal to a retransmission antenna.

Example 17 includes the remote unit of Example 16, further comprising: a bandpass-filter circuit configured to filter the amplified electrical signal from the amplifier circuit to generate an output electrical signal, and to couple the output electrical signal to a retransmission antenna.

Example 18 includes the remote unit of any of Examples 16-17, further comprising: a bandpass-filter circuit configured to filter the amplified electrical signal from the amplifier circuit; and a signal-divider circuit configured to generate, from the filtered electrical signal, output electrical signals, and to couple each of the output electrical signals to a respective retransmission antenna.

Example 19 includes the remote unit of any of Examples 16-18, further comprising: a bandpass-filter circuit configured to filter the amplified electrical signal from the amplifier circuit; a higher-power output port configured to be coupled to a retransmission antenna; lower-power output ports each configured to be coupled to a respective retransmission antenna; a signal-divider circuit configured to generate, from the filtered electrical signal, output electrical signals, and to couple each of the output electrical signals to a respective one of the lower-power output ports; and a switch configured to selectively couple the filtered electrical signal to the higher-power output port or to the signal divider.

Example 20 includes the remote unit of any of Examples 16-19, further comprising: a signal-divider circuit configured to generate, from the intermediate electrical signal, multiple lower-power electrical signals; amplifier circuits, including the amplifier circuit, each configured to amplify a respective one of the lower-power electrical signals; and bandpass-filter circuits each configured to filter a respective one of the amplified electrical signals to generate a respective output electrical signal, and to couple the respective output electrical signal to a respective retransmission antenna.

Example 21 includes the remote unit of any of Examples 16-20, further comprising: a feedback circuit configured to generate an output electrical feedback signal from the amplified electrical signal; and wherein the converter circuit is configured to convert the output electrical feedback signal into an optical feedback signal, and to provide the optical feedback signal to the master unit.

Example 22 includes the remote unit of any of Examples 16-21, further comprising: a feedback circuit configured to generate an output electrical feedback signal from the amplified electrical signal; wherein the converter circuit is configured to convert the output electrical feedback signal to an optical feedback signal, to provide the optical feedback signal to the master controller; to receive an optical control signal from the master controller, and to convert the optical control signal to an input electrical control signal; and wherein at least one of the converter circuit, amplifier circuit, feedback circuit, and other circuit of the remote unit is configured to alter its configuration in response to the input electrical control signal.

Example 23 includes the remote unit of any of Examples 16-22, further comprising; wherein the converter circuit is further configured to convert output electrical feedback signals into respective optical feedback signals, to provide the optical feedback signals to the master unit, and to convert optical control signals from the master unit into respective input electrical control signals; a signal-divider circuit configured to generate, from the intermediate electrical signal, multiple lower-power electrical signals; amplifier circuits each having a respective configuration parameter and configured to amplify a respective one of the lower-power electrical signals; bandpass-filter circuits each having a respective configuration parameter and configured to filter a respective one of the amplified electrical signals to generate a respective output electrical signal, and to couple the respective output electrical signal to a respective retransmission antenna; feedback circuits each configured to generate a respective one of the output electrical feedback signals from a respective one of the output electrical signals; and wherein at least one of the amplifier circuits and bandpass-filter circuits are configured to alter the configuration parameter in response to a respective one of the input electrical control signals.

Example 24 includes a system, comprising: an input antenna configured to receive an electrical signal from a satellite and to generate an input electrical signal in response to the received electrical signal, a signal repeater coupled to the input antenna and including. a master unit including master-unit circuitry configured to convert the input electrical signal into an optical signal, and a remote unit including remote-unit circuitry configured to convert the optical signal into an intermediate electrical signal, and to amplify the intermediate electrical signal to generate an output electrical signal; and a retransmit antenna coupled to the signal repeater and configured to receive the output electrical signal, and to transmit a retransmit signal in response the output electrical signal.

Example 25 includes the system of Example 24 wherein the input antenna is configured to excite a frequency band within which the received electrical signal is disposed.

Example 26 includes the system of any of Examples 24-25, wherein the signal repeater further includes an optical fiber coupled between the master unit and the remote unit.

Example 27 includes a system, comprising: a first remote unit for a first signal repeater, the first remote unit including a first converter circuit configured to convert a first optical signal from a first master unit of the first signal repeater into a first intermediate electrical signal, and a first amplifier circuit configured to amplify the first intermediate electrical signal; a second remote unit for a second signal repeater, the second remote unit including a second converter circuit configured to convert a second optical signal from a second master unit of the second signal repeater into a second intermediate electrical signal, and a second amplifier circuit configured to amplify the second intermediate electrical signal; and a combiner circuit configured to generate, from the first and second amplified intermediate electrical signals, a combined electrical signal, and to couple the combined electrical signal to a retransmission antenna.

Example 28 includes a method, comprising: receiving an input electrical data signal from a satellite-signal-receive antenna; converting the input electrical data signal into an optical data signal; transmitting the optical data signal over an optical path; receiving the transmitted optical data signal from the optical path; converting the received optical data signal into an output electrical data signal; and exciting a retransmission antenna with the output electrical data signal.

Example 29 includes the method of Example 28 wherein converting the received optical data signal into an output electrical data signal includes: converting the received optical data signal into an intermediate electrical data signal; amplifying the intermediate electrical data signal; bandpass filtering the amplified electrical data signal; generating, from the filtered electrical data signal, output electrical data signals; and coupling each of the output electrical data signals to a respective retransmission antenna.

Example 30 includes the method of any of Examples 28-29, further comprising: generating an output electrical feedback signal from the output electrical data signal; converting the output electrical feedback signal into an optical feedback signal; transmitting the optical feedback signal over the optical path; receiving the optical feedback signal from the optical path; converting the optical feedback signal into an input electrical feedback signal; generating an input electrical control signal in response to the input electrical feedback signal; converting the input electrical control signal into an optical control signal; transmitting the optical control signal over the optical path; converting the optical control signal into an output electrical control signal; and altering the converting of the received optical data signal into the output electrical data signal in response to the output electrical control signal.

A number of embodiments of the invention defined by the following claims have been described. Nevertheless, it will be understood that various modifications to the described embodiments may be made without departing from the spirit and scope of the claimed invention. For example, an alternative described in conjunction with one embodiment may be applied to another embodiment. Accordingly, other embodiments are within the scope of the following claims.

The invention claimed is:

1. A signal repeater, comprising:
a master unit including master-unit circuitry configured
to receive an input electrical signal from a satellite-signal-receive antenna, and
to convert the input electrical signal into an optical signal; and
a remote unit including remote-unit circuitry configured
to convert the optical signal into an intermediate electrical signal,
to amplify the intermediate electrical signal to generate an output electrical signal,
to couple the output electrical signal to a retransmission antenna, and
to generate an optical feedback signal from the output electrical signal.

2. The signal repeater of claim 1, further comprising an optical fiber configured to couple the optical signal from the master unit to the remote unit.

3. The signal repeater of claim 2 wherein the optical fiber is configured to attenuate the optical signal no more than approximately 0.5 decibels per kilometer.

4. The signal repeater of claim 1 wherein the master-unit circuitry is further configured to receive an input electrical signal having a frequency within a frequency band of approximately 2324 MHz to 2341.5 MHz.

5. The signal repeater of claim 1 wherein the master-unit circuitry is further configured:
to amplify the input electrical signal; and
to convert the amplified electrical signal into the optical signal.

6. The signal repeater of claim 1 wherein:
the input electrical signal is encoded according to a code; and
the master-unit circuitry is further configured
to encode the input electrical signal according to a different code; and
to convert the different-coded electrical signal into the optical signal.

7. The signal repeater of claim 1 wherein the remote-unit circuitry further includes:
an opto-electrical converter configured to convert the optical signal into the intermediate electrical signal;
an amplifier configured to amplify the intermediate electrical signal; and
a bandpass filter configured
to filter the amplified electrical signal to generate the output electrical signal, and
to couple the output electrical signal to a retransmission antenna.

8. The signal repeater of claim 1 wherein the remote-unit circuitry further includes:
an opto-electrical converter configured to convert the optical signal into the intermediate electrical signal;
an amplifier configured to amplify the intermediate electrical signal;
a bandpass filter configured to filter the amplified electrical signal; and
a signal divider configured
to generate, from the filtered electrical signal, output electrical signals, and
to couple each of the output electrical signals to a respective retransmission antenna.

9. A signal repeater, comprising:
a master unit including master-unit circuitry configured
to receive an input electrical signal from a satellite-signal-receive antenna, and
to convert the input electrical signal into an optical signal; and
a remote unit including remote-unit circuitry configured
to convert the optical signal into an intermediate electrical signal,
to amplify the intermediate electrical signal to generate an output electrical signal, and
to couple the output electrical signal to a retransmission antenna; and
wherein the remote-unit circuitry includes
an opto-electrical converter configured to convert the optical signal into the intermediate electrical signal,
an amplifier configured to amplify the intermediate electrical signal,
a bandpass filter configured to filter the amplified electrical signal,
a higher-power output port configured to be coupled to a retransmission antenna,
lower-power output ports each configured to be coupled to a respective retransmission antenna,
a signal divider configured
to generate, from the filtered electrical signal, output electrical signals, and
to couple each of the output electrical signals to a respective one of the lower-power output ports, and
a switch configured to selectively couple the filtered electrical signal to the higher-power output port or to the signal divider.

10. The signal repeater of claim 1 wherein the remote-unit circuitry further includes:
an opto-electrical converter configured to convert the optical signal into the intermediate electrical signal;
a signal divider configured to generate, from the intermediate electrical signal, multiple lower-power electrical signals;
amplifiers each configured to amplify a respective one of the lower-power electrical signals; and
bandpass filters each configured
to filter a respective one of the amplified electrical signals to generate a respective output electrical signal, and
to couple the respective output electrical signal to a respective retransmission antenna.

11. The signal repeater of claim 1 wherein:
the remote-unit circuitry is further configured
to generate an output electrical feedback signal from the output electrical signal,
to convert the output electrical feedback signal into the optical feedback signal, and
to provide the optical feedback signal to the master unit; and
the master-unit circuitry is further configured
to receive the optical feedback signal, and to convert the optical feedback signal into an input electrical feedback signal.

12. The signal repeater of claim 1 wherein:
the remote-unit circuitry is further configured
to generate an output electrical feedback signal from the output electrical signal,
to convert the output electrical feedback signal to the optical feedback signal,
to provide the optical feedback signal to the master unit;
to receive an optical control signal from the master unit,
to convert the optical control signal to an input electrical control signal, and
to alter a configuration of the remote-unit circuitry in response to the input electrical control signal; and
the master-unit circuitry is further configured
to receive the optical feedback signal from the remote unit,
to convert the optical feedback signal to an input electrical feedback signal,
to provide the input electrical feedback signal to an analyzer circuit configured to generate an output electrical control signal in response to the input electrical feedback signal,
to convert the output electrical control signal into the optical control signal, and
to provide the optical control signal to the remote unit.

13. The signal repeater of claim 1 wherein:
the remote-unit circuitry further includes
an opto-electrical converter configured
to convert the optical signal into the intermediate electrical signal,
to convert output electrical feedback signals into respective optical feedback signals including the optical feedback signal,
to provide the optical feedback signals to the master unit, and
to convert optical control signals from master unit into respective input electrical control signals,
a signal divider configured to generate, from the intermediate electrical signal, multiple lower-power electrical signals,
amplifiers each having a respective configuration parameter and configured to amplify a respective one of the lower-power electrical signals,
bandpass filters each having a respective configuration parameter and configured
to filter a respective one of the amplified electrical signals to generate a respective output electrical signal, and
to couple the respective output electrical signal to a respective retransmission antenna,
feedback generators each configured to generate a respective one of the output electrical feedback signals from a respective one of the output electrical signals, and
at least one of the amplifiers and the bandpass filters configured to alter the configuration parameter in response to a respective one of the input electrical control signals; and
the master-unit circuitry is further configured
to receive the optical feedback signals,
to convert the optical feedback signals into respective input electrical feedback signals,
to provide the input electrical feedback signals to an analyzer circuit configured to generate output electrical control signals in response to the input electrical feedback signals, respectively,
to convert the output electrical control signals into optical control signals, respectively, and
to provide the optical control signals to the remote unit.

14. A master unit for a signal repeater, the master unit comprising:
a processing circuit configured to process an input electrical signal from a satellite-signal-receive antenna; and
a converter circuit configured
to convert the processed electrical signal into an optical signal,
to provide the optical signal to a remote unit for the signal repeater via an optical path, and
to convert an optical feedback signal received from the remote unit via the optical path into an electrical feedback signal.

15. The master unit of claim 14, further comprising:
wherein the processed electrical signal is encoded according to a code;
a transcoding circuit configured to encode the processed electrical signal according to a different code; and
wherein the converter circuit is configured to convert the processed electrical signal encoded according to the different code into the optical signal.

16. A remote unit for a signal repeater, the remote unit comprising:
a converter circuit configured
to convert a downlink optical signal from a master unit of the signal repeater into a downlink intermediate electrical signal; and
an amplifier circuit configured
to amplify the downlink intermediate electrical signal, and
to couple the downlink amplified electrical signal to a retransmission antenna; and
a feedback circuit configured to generate an output electrical feedback signal from the downlink amplified electrical signal; and
wherein the converter circuit is further configured
to convert the output electrical feedback signal into an optical feedback signal, and
to provide the optical feedback signal to the master unit.

17. The remote unit of claim 16, further comprising:
a bandpass-filter circuit configured
to filter the downlink amplified electrical signal from the amplifier circuit to generate a downlink output electrical signal, and
to couple the downlink output electrical signal to a retransmission antenna.

18. The remote unit of claim 16, further comprising:
a bandpass-filter circuit configured
to filter the downlink amplified electrical signal from the amplifier circuit; and
a signal-divider circuit configured
to generate, from the downlink filtered electrical signal, downlink output electrical signals, and
to couple each of the downlink output electrical signals to a respective retransmission antenna.

19. A remote unit for a signal repeater, the remote unit comprising:
a converter circuit configured
to convert an optical signal from a master unit of the signal repeater into an intermediate electrical signal;
an amplifier circuit configured
to amplify the intermediate electrical signal, and to couple the amplified electrical signal to a retransmission antenna;
a bandpass-filter circuit configured
  to filter the amplified electrical signal from the amplifier circuit;
a higher-power output port configured to be coupled to a retransmission antenna;
lower-power output ports each configured to be coupled to a respective retransmission antenna;
a signal-divider circuit configured
  to generate, from the filtered electrical signal, output electrical signals, and
  to couple each of the output electrical signals to a respective one of the lower-power output ports; and
a switch configured to selectively couple the filtered electrical signal to the higher-power output port or to the signal-divider circuits.

20. The remote unit of claim 16, further comprising:
a signal-divider circuit configured to generate, from the downlink intermediate electrical signal, multiple lower-power downlink electrical signals;
amplifier circuits, including the amplifier circuit, each configured to amplify a respective one of the lower-power downlink electrical signals; and
bandpass-filter circuits each configured
  to filter a respective one of the downlink amplified electrical signals to generate a respective downlink output electrical signal, and
  to couple the respective downlink output electrical signal to a respective retransmission antenna.

21. The remote unit of claim 16, further comprising:
wherein the converter circuit is configured
  to receive an optical control signal from the master unit, and
  to convert the optical control signal to an input electrical control signal; and
wherein at least one of the converter circuit, amplifier circuit, feedback circuit, and other circuit of the remote unit is configured to alter its configuration in response to the input electrical control signal.

22. The remote unit of claim 16, further comprising:
wherein the converter circuit is further configured
  to convert output electrical feedback signals into respective optical feedback signals including the optical feedback signal,
  to provide the optical feedback signals to the master unit, and
  to convert optical control signals from the master unit into respective input electrical control signals;
a signal-divider circuit configured to generate, from the downlink intermediate electrical signal, multiple lower-power downlink electrical signals;
amplifier circuits each having a respective configuration parameter and configured to amplify a respective one of the lower-power downlink electrical signals;
bandpass-filter circuits each having a respective configuration parameter and configured
  to filter a respective one of the downlink amplified electrical signals to generate a respective downlink output electrical signal, and
  to couple the respective downlink output electrical signal to a respective retransmission antenna;
feedback circuits each configured to generate a respective one of the output electrical feedback signals from a respective one of the downlink output electrical signals; and
wherein at least one of the amplifier circuits and bandpass-filter circuits are configured to alter the configuration parameter in response to a respective one of the input electrical control signals.

23. A system, comprising:
an input antenna configured to receive an electrical signal from a satellite and to generate an input electrical signal in response to the received electrical signal,
a signal repeater coupled to the input antenna and including
  a master unit including master-unit circuitry configured to convert the input electrical signal into an optical signal and to receive an optical feedback signal, and
  a remote unit including remote-unit circuitry configured
    to convert the optical signal into an intermediate electrical signal,
    to amplify the intermediate electrical signal to generate an output electrical signal, and
    to generate the optical feedback signal in response to the output electrical signal; and
a retransmit antenna coupled to the signal repeater and configured
  to receive the output electrical signal, and
  to transmit a retransmit signal in response the output electrical signal.

24. The system of claim 23 wherein the input antenna is configured to excite a frequency band within which the received electrical signal is disposed.

25. The system of claim 23, wherein the signal repeater further includes an optical fiber coupled between the master unit and the remote unit.

26. A method, comprising:
receiving an input electrical data signal from a satellite-signal-receive antenna;
converting the input electrical data signal into an optical data signal;
transmitting the optical data signal over an optical path;
receiving the transmitted optical data signal from the optical path;
converting the received optical data signal into an output electrical data signal;
generating an optical feedback signal in response to the output electrical data signal; and
exciting a retransmission antenna with the output electrical data signal.

27. The method of claim 26 wherein converting the received optical data signal into an output electrical data signal includes:
converting the received optical data signal into an intermediate electrical data signal;
amplifying the intermediate electrical data signal;
bandpass filtering the amplified electrical data signal;
generating, from the filtered electrical data signal, output electrical data signals including the output electrical data signal; and
coupling each of the output electrical data signals to a respective retransmission antenna.

28. The method of claim 26, further comprising:
generating an output electrical feedback signal from the output electrical data signal;
converting the output electrical feedback signal into the optical feedback signal;
transmitting the optical feedback signal over the optical path;
receiving the optical feedback signal from the optical path;

converting the optical feedback signal into an input electrical feedback signal;
generating an input electrical control signal in response to the input electrical feedback signal;
converting the input electrical control signal into an optical control signal;
transmitting the optical control signal over the optical path;
converting the optical control signal into an output electrical control signal; and
altering the converting of the received optical data signal into the output electrical data signal in response to the output electrical control signal.

* * * * *